(12) United States Patent
Golitschek Edler von Elbwart

(10) Patent No.: US 12,355,705 B2
(45) Date of Patent: *Jul. 8, 2025

(54) APERIODIC TRIGGERING OF CHANNEL QUALITY INFORMATION USING PHYSICAL DOWNLINK CONTROL CHANNEL

(71) Applicant: Sun Patent Trust, New York, NY (US)

(72) Inventor: Alexander Golitschek Edler von Elbwart, Darmstadt (DE)

(73) Assignee: Sun Patent Trust, New York, NY (US)

( * ) Notice: Subject to any disclaimer, the term of this patent is extended or adjusted under 35 U.S.C. 154(b) by 39 days.

This patent is subject to a terminal disclaimer.

(21) Appl. No.: 18/492,161

(22) Filed: Oct. 23, 2023

(65) Prior Publication Data

US 2024/0048336 A1  Feb. 8, 2024

Related U.S. Application Data

(63) Continuation of application No. 17/738,845, filed on May 6, 2022, now Pat. No. 11,838,242, which is a
(Continued)

(30) Foreign Application Priority Data

Aug. 4, 2009  (EP) .................................... 09010053
Dec. 10, 2009 (EP) .................................... 09015319

(51) Int. Cl.
*H04L 5/00* (2006.01)
*H04L 1/00* (2006.01)
(Continued)

(52) U.S. Cl.
CPC .......... *H04L 5/0057* (2013.01); *H04L 1/0026* (2013.01); *H04L 1/0027* (2013.01);
(Continued)

(58) Field of Classification Search
CPC ..... H04L 5/0057; H04L 43/08; H04L 1/0026; H04L 1/0027; H04L 1/0028; H04L 5/001;
(Continued)

(56) References Cited

U.S. PATENT DOCUMENTS 8,059,606 B2  11/2011 Lee et al.
8,665,813 B2 * 3/2014 Golitschek Edler von Elbwart ...
H04L 5/0085
370/329
(Continued)

FOREIGN PATENT DOCUMENTS

CN       101448332 A    6/2009
KR  10-2008-0065556 A  7/2008
(Continued)

OTHER PUBLICATIONS

3GPP TS 36.211 V8.7.0, "3rd Generation Partnership Project; Technical Specification Group Radio Access Network; Evolved Universal Terrestrial Radio Access (E-UTRA); Physical Channels and Modulation (Release 8)," May 2009, 83 pages.
(Continued)

*Primary Examiner* — Benjamin H Elliott, IV
(74) *Attorney, Agent, or Firm* — Seed IP Law Group LLP

(57) ABSTRACT

The invention relates methods for triggering channel quality feedback for at least one of plural component carriers of a communication system available for downlink transmission. The invention suggests a mechanism for triggering channel quality feedback from a terminal where the downlink control signaling overhead for the selection of component carrier(s) to be reported on is minimized. One aspect of the invention is a new interpretation of a predetermined format for dedicated control information comprising a CQI request flag, which is depending on the status of the CQI request flag. In case the CQI request flag is set at least one further bit of the dedicated control information is interpreted as information
(Continued)

indicative of the one or more component carriers available for downlink transmission to the terminal and the terminal is providing channel quality feedback on the channel quality experienced on the indicated component carrier or component carriers.

12 Claims, 15 Drawing Sheets

Related U.S. Application Data continuation of application No. 16/841,928, filed on Apr. 7, 2020, now Pat. No. 11,356,226, which is a continuation of application No. 16/040,396, filed on Jul. 19, 2018, now Pat. No. 10,652,004, which is a continuation of application No. 15/451,248, filed on Mar. 6, 2017, now Pat. No. 10,057,041, which is a continuation of application No. 14/577,133, filed on Dec. 19, 2014, now Pat. No. 9,628,248, which is a continuation of application No. 14/098,389, filed on Dec. 5, 2013, now Pat. No. 8,948,118, which is a continuation of application No. 13/388,282, filed as application No. PCT/EP2010/004722 on Aug. 2, 2010, now Pat. No. 8,665,813.

(51) Int. Cl.
*H04L 43/08* (2022.01)
*H04W 72/04* (2023.01)

(52) U.S. Cl.
CPC ............ *H04L 1/0028* (2013.01); *H04L 5/001* (2013.01); *H04L 5/0085* (2013.01); *H04L 43/08* (2013.01); *H04W 72/04* (2013.01)

(58) Field of Classification Search
CPC ..... H04L 5/0085; H04B 17/24; H04B 7/0632; H04W 72/04; H04W 24/10
See application file for complete search history.

(56) References Cited

U.S. PATENT DOCUMENTS

| | | | |
|---|---|---|---|
| 8,948,118 B2* | 2/2015 | Golitscheck Elder von Elbwart | H04L 1/0026 370/329 |
| 9,628,248 B2* | 4/2017 | Golitschek Edler von Elbwart | H04L 1/0027 |
| 10,057,041 B2* | 8/2018 | Golitschek Edler von Elbwart | H04L 5/0085 |
| 10,652,004 B2* | 5/2020 | Golitschek Edler von Elbwart | H04L 1/0026 |
| 11,356,226 B2* | 6/2022 | Golitschek Edler von Elbwart | H04L 5/0057 |
| 11,838,242 B2* | 12/2023 | Golitschek Edler von Elbwart | H04L 1/0028 |
| 2006/0148411 A1 | 7/2006 | Cho et al. | |
| 2006/0223449 A1 | 10/2006 | Sampath et al. | |
| 2008/0026744 A1 | 1/2008 | Frederiksen et al. | |
| 2008/0214193 A1 | 9/2008 | Jeong et al. | |
| 2008/0253336 A1 | 10/2008 | Parkvall et al. | |
| 2009/0175232 A1 | 7/2009 | Kolding | |
| 2009/0190528 A1* | 7/2009 | Chung | H04B 7/063 370/328 |
| 2009/0238121 A1* | 9/2009 | Kotecha | H04L 1/0031 370/329 |
| 2009/0303900 A1 | 12/2009 | Cho et al. | |
| 2010/0014473 A1* | 1/2010 | Ofuji | H04L 1/0029 370/329 |
| 2010/0020712 A1 | 1/2010 | Lee et al. | |
| 2010/0039953 A1* | 2/2010 | Zhang | H04L 1/0026 370/252 |
| 2010/0165931 A1* | 7/2010 | Nimbalker | H04L 1/1671 370/329 |
| 2010/0260119 A1 | 10/2010 | Kishiyama et al. | |
| 2010/0273435 A1 | 10/2010 | Sun et al. | |
| 2011/0134780 A1* | 6/2011 | Jersenius | H04L 1/003 370/252 |
| 2011/0268067 A1 | 11/2011 | Seo et al. | |
| 2011/0299484 A1* | 12/2011 | Nam | H04L 1/0025 370/329 |
| 2011/0305161 A1* | 12/2011 | Ekpenyong | H04L 5/001 370/252 |
| 2011/0317652 A1* | 12/2011 | Kim | H04W 24/10 370/329 |
| 2012/0147831 A1* | 6/2012 | Golitschek | H04L 1/0026 370/329 |
| 2013/0188585 A1 | 7/2013 | Sun et al. | |
| 2013/0301575 A1* | 11/2013 | Wang | H04W 72/54 370/329 |
| 2014/0169198 A1* | 6/2014 | Golitschek Edler von Elbwart | H04L 1/0027 370/252 |
| 2015/0103797 A1* | 4/2015 | Golitschek Edler von Elbwart | H04L 5/0057 370/329 |
| 2017/0180101 A1* | 6/2017 | Golitschek Edler von Elbwart | H04L 43/08 |
| 2018/0351726 A1* | 12/2018 | Golitschek Edler von Elbwart | H04L 5/001 |
| 2020/0235893 A1* | 7/2020 | Golitschek Edler von Elbwart | H04L 1/0026 |
| 2022/0263634 A1* | 8/2022 | Golitschek Edler von Elbwart | H04L 1/0027 |
| 2024/0048336 A1* | 2/2024 | Golitschek Edler von Elbwart | H04L 1/0027 |

FOREIGN PATENT DOCUMENTS

| | | |
|---|---|---|
| KR | 10-2009-0076784 A | 7/2009 |
| WO | WO 2008084953 A1 | 7/2008 |
| WO | WO 2009087168 A2 | 7/2009 |
| WO | WO 2009088225 A3 | 7/2009 |

OTHER PUBLICATIONS

3GPP TS 36.212 V8.3.0, "3rd Generation Partnership Project; Technical Specification Group Radio Access Network; Evolved Universal Terrestrial Radio Access (E-UTRA); Multiplexing and channel coding (Release 8)," May 2008, 48 pages.

3GPP TS 36.212 V8.7.0, "3rd Generation Partnership Project; Technical Specification Group Radio Access Network; Evolved Universal Terrestrial Radio Access (E-UTRA); Multiplexing and channel coding (Release 8)," May 2009, 60 pages.

3GPP TS 36.213 V8.7.0, "3rd Generation Partnership Project; Technical Specification Group Radio Access Network; Evolved Universal Terrestrial Radio Access (E-UTRA); Physical layer procedures (Release 8)," Section 6.2 and 7.2, May 2009, 4 pages.

3GPP TS 36.321 V8.5.0, "3rd Generation Partnership Project; Technical Specification Group Radio Access Network; Evolved Universal Terrestrial Radio Access (E-UTRA); Medium Access Control (MAC) protocol specification (Release 8)," Mar. 2009, 46 pages.

Alcatel-Lucent, "Component carrier indication for bandwidth extension in LTE-A," R1-092330, 3GPP TSG-RAN WG1 #57bis, Agenda Item: 15.4, Los Angeles, California, USA, Jun. 29-Jul. 3, 2009, 5 pages.

Chinese Office Action, dated May 14, 2014, for corresponding Chinese Patent Application No. 2010800445946, 17 pages. [With English Translation].

English Translation of The Notice of Preliminary Rejected, dated Mar. 3, 2016, for corresponding KR Application No. 2012-7003137, 14 pages.

(56) References Cited

OTHER PUBLICATIONS

Etemad et al., "Updated Proposal for Generalized Multi-carrier Support in IEEE 802.16m Systems," IEEE 802.16 Broadband Wireless Access Working Group, May 5, 2008, 13 pages.
Fitzek, "The Medium is the Message," Proceedings of IEEE International Conference on Communications (ICC), 2006, 6 pages.
Ghosh et al., "Multi-Antenna System Design for 3GPP LTE," 2008 IEEE International Symposium on Wireless Communication Systems, Oct. 2008.
Huawei, "PUCCH design for carrier aggregation," R1-091810, 3GPP TSG RAN WG1 Meeting #57, Agenda Item: 15.4, San Francisco, USA, May 4-8, 2009, 8 pages.
Indian Office Action, mailed May 11, 2021, for Indian Application No. 201938028461, 7 pages.
International Search Report, for corresponding International Application No. PCT/EP2010/004722, mailed Nov. 3, 2010, 4 pages.
ITRI, "Carrier Identification in PDCCH," R1-092683, Agenda Item: 15.4, 3GPP TSG RAN WG1 Meeting #57bis, Los Angeles, CA, USA, Jun. 29-Jul. 3, 2009, 3 pages.
LG Electronics, "UL control channel design to support carrier aggregation," R1-091204, Agenda Item: 15.4, 3GPP TSG RAN WG1 #56bis, Seoul, Korea, Mar. 23-27, 2009, 6 pages.
"LTE; Evolved Universal Terrestrial Radio Access (E-UTRA); Physical layer procedures (3GPP TS 36.213 version 8.7.0 Release 8)," ETSI TS 136 213 V8.7.0, Jun. 2009, 80 pages.
Notice of Reasons for Rejection dated Feb. 3, 2015, for corresponding JP Application No. 2014-111564, 5 pages. [With English Translation].
Qualcomm Europe, "CQI Feedback for Multicarrier Operation," R1-092708, 3GPP TSG RAN WG1 #57bis, Agenda Item: 15.4, Los Angeles, USA, Jun. 29-Jul. 3, 2009, 4 pages.
Qualcomm Europe, "Multicarrier Control for LTE-Advanced," R1-090862, 3GPP TSG RAN WG1 #56, Agenda Item: 12.1, Athens, Greece, Feb. 9-13, 2009, 6 pages.
Russian Office Action, dated Mar. 21, 2014, for corresponding Russian Patent Application No. 2012103605/07(005372), 9 pages. [With English Translation].
Samsung, "SRS Transmission Issues in LTE-A," R1-092677, Agenda Item: 15.5, 3GPP TSG RAN WG1 #57bis, Los Angeles, USA, Jun. 29-Jul. 3, 2009, 3 pages.
Sesia et al., "LTE—The UMTS Long Term Evolution: From Theory to Practice," John Wiley and Sons, Ltd., West Sussex, United Kingdom, 2009, pp. 192-206. (29 Total Pages).

* cited by examiner

| Flag Format 0/1A | Hopping Flag | Resource Block Assignment | MCS & RV | NDI | TPC for PUSCH | Cyclic Shift DMRS | CQI request | padding bits to Format 1A |
|---|---|---|---|---|---|---|---|---|
| = 0 | 0/1 | 5 to 13 bits | 5 bits | 0/1 | 2 bits | 3 bits | 0/1 | |

Fig. 4 (PRIOR ART)

| Flag Format 0/1A | Hopping Flag | Resource Block Assignment | | MCS & RV | NDI | TPC for PUSCH | Cyclic Shift DMRS | CQI request | padding bits to Format 1A |
|---|---|---|---|---|---|---|---|---|---|
| = 0 | = 1 | 1-2 bits | 5 to 13 bits | 5 bits | 0/1 | 2 bits | 3 bits | 0/1 | |

↑ Hopping Configuration Bits

Fig. 7

| Flag Format 0/1A | Hopping Flag | Resource Block Assignment | MCS & RV | NDI | TPC for PUSCH | Cyclic Shift DMRS | CQI request | padding bits to Format 1A |
|---|---|---|---|---|---|---|---|---|
| = 0 | 0/1 | 5 to 13 bits | 5 bits | 0/1 | 2 bits | 3 bits | = 1 | | interpret Hopping Flag as CQI control information

Fig. 8

| Flag Format 0/1A | Hopping Flag | Resource Block Assignment | MCS & RV | NDI | TPC for PUSCH | Cyclic Shift DMRS | CQI request | padding bits to Format 1A |
|---|---|---|---|---|---|---|---|---|
| = 0 | 0/1 | 5 to 13 bits | 5 bits | 0/1 | 2 bits | 3 bits | = 1 | | interpret padding bit(s) Flag as CQI control information

Fig. 9

| Flag Format 0/1A | CQI control information | Resource Block Assignment | MCS & RV | NDI | TPC for PUSCH | Cyclic Shift DMRS | CQI request | padding bits to Format 1A |
|---|---|---|---|---|---|---|---|---|
| = 0 | 0/1 | 5 to 13 bits | 5 bits | 0/1 | 2 bits | 3 bits | = 1 | |

Fig. 13

| Flag Format 0/1A | Hopping Flag | Resource Block Assignment | MCS & RV | NDI | TPC for PUSCH | Cyclic Shift DMRS | CQI request | CQI control information |
|---|---|---|---|---|---|---|---|---|
| = 0 | 0/1 | 5 to 13 bits | 5 bits | 0/1 | 2 bits | 3 bits | = 1 | |

Fig. 14

| Flag Format 0/1A | CQI control information | Resource Block Assignment | MCS & RV | NDI | TPC for PUSCH | Cyclic Shift DMRS | CQI request | padding bits to Format 1A |
|---|---|---|---|---|---|---|---|---|
| = 0 | 2-3 bits | 3 to 12 bits | 5 bits | 0/1 | 2 bits | 3 bits | = 1 | |

Fig. 15

| Flag Format 0/1A | Hopping Flag | Resource Block Assignment | MCS & RV | NDI | TPC for PUSCH | CQI control information | CQI request | padding bits to Format 1A |
|---|---|---|---|---|---|---|---|---|
| = 0 | 0/1 | 5 to 13 bits | 5 bits | 0/1 | 2 bits | 3 bits | = 1 | |

| Flag Format 0/1A | CQI control information (part 1) | Resource Block Assignment | MCS & RV | NDI | TPC for PUSCH | CQI control information (part 2) | CQI request | padding bits to Format 1A |
|---|---|---|---|---|---|---|---|---|
| = 0 | 0/1 | 5 to 13 bits | 5 bits | 0/1 | 2 bits | 3 bits | = 1 | |

Fig. 19

| Flag Format 0/1A | Hopping Flag | Resource Block Assignment | UCI | MCS & RV | NDI | TPC for PUSCH | Cyclic Shift DMRS | CQI request | padding bits to Format 1A |
|---|---|---|---|---|---|---|---|---|---|
| = 0 | 0/1 | 5 to 13 bits | 1 to 3 bits | 5 bits | 0/1 | 2 bits | 3 bits | 0/1 | |

Fig. 22

| CIF (=UCI) | Flag Format 0/1A | Hopping Flag | Resource Block Assignment | MCS & RV | NDI | TPC for PUSCH | Cyclic Shift DMRS | CQI request | padding bits to Format 1A |
|---|---|---|---|---|---|---|---|---|---|
| 3 bits | = 0 | 0/1 | 5 to 13 bits | 5 bits | 0/1 | 2 bits | 3 bits | 0/1 | |

Fig. 23

| CIF (=UCI) | Flag Format 0/1A | Hopping Flag | CQI request | Resource Block Assignment | MCS & RV | NDI | TPC for PUSCH | Cyclic Shift DMRS | padding bits to Format 1A |
|---|---|---|---|---|---|---|---|---|---|
| 3 bits | = 0 | 0/1 | 0/1 | 5 to 13 bits | 5 bits | 0/1 | 2 bits | 3 bits | |

APERIODIC TRIGGERING OF CHANNEL QUALITY INFORMATION USING PHYSICAL DOWNLINK CONTROL CHANNEL

FIELD OF THE INVENTION

The invention relates methods for triggering and reporting on a downlink channel quality (channel quality feedback) experienced by a terminal (e.g. a mobile terminal or a user equipment) by means of channel quality information for at least one of plural component carriers of a communication system available for downlink transmission to the terminal. Furthermore, the invention also relates to an implementation of these methods in hardware and software.

TECHNICAL BACKGROUND

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio-access technology that is highly competitive.

In order to be prepared for further increasing user demands and to be competitive against new radio access technologies 3GPP introduced a new mobile communication system which is called Long Term Evolution (LTE). LTE is designed to meet the carrier needs for high speed data and media transport as well as high capacity voice support to the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is to be finalized as Release 8 (LTE). The LTE system represents efficient packet-based radio access and radio access networks that provide full IP-based functionalities with low latency and low cost. The detailed system requirements are given in. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP), and its affinity to different transmission bandwidth arrangements. Single-carrier frequency division multiple access (SC-FDMA) based radio access was adopted in the uplink, since provisioning of wide area coverage was prioritized over improvement in the peak data rate considering the restricted transmission power of the user equipment (UE). Many key packet radio access techniques are employed including multiple-input multiple-output (MIMO) channel transmission techniques, and a highly efficient control signaling structure is achieved in LTE (Release 8).

LTE Architecture

The overall architecture is shown in FIG. 1 and a more detailed representation of the E-UTRAN architecture is given in FIG. 2. The E-UTRAN consists of eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC), and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle state user equipments, the SGW terminates the downlink data path and triggers paging when downlink data arrives for the user equipment. It manages and stores user equipment contexts, e.g. parameters of the IP bearer service, network internal routing information. It also performs replication of the user traffic in case of lawful interception.

The MME is the key control-node for the LTE access-network. It is responsible for idle mode user equipment tracking and paging procedure including retransmissions. It is involved in the bearer activation/deactivation process and is also responsible for choosing the SGW for a user equipment at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Channel Quality Report in LTE (Release 8)

Channel quality information is used in a multi-user communication system to determine the quality of channel resource(s) for one or more users. This information may be used to aid in a multi-user scheduler algorithm of the eNodeB (or other radio-access elements such as a relay node) to assign channel resources to different users, or to adapt link parameters (e.g. modulation scheme, coding rate, or transmit power) so as to exploit the assigned channel resource to its fullest potential.

Assuming a multi-carrier communication system, e.g. employing OFDM, as for example discussed in the "Long Term Evolution" work item of 3GPP, the smallest unit of resources that can be assigned/allocated by the scheduler is one "resource block". A physical resource block is defined as $N_{symb}^{DL}$ consecutive OFDM symbols in the time domain and $N_{sc}^{RB}$ consecutive subcarriers in the frequency domain as exemplified in FIG. 3. In 3GPP LTE (Release 8), a physical resource block thus consists of $N_{symb}^{DL} \times N_{sc}^{RB}$ resource elements, corresponding to one slot in the time domain and 180 kHz in the frequency domain (for further details on the downlink resource grid, see 3GPP TS 36.211, "Evolved Universal Terrestrial Radio Access (E-UTRA); Physical Channels and Modulation (Release 8)", version 8.7.0, section 6.2, available at http://www.3gpp.org and incorporated herein by reference). In the ideal case, channel quality information for all resource blocks for all users should be always available to the scheduler so as to take an optimum scheduling decision. However, due to constrained capacity of the feedback channel it is not possible/feasible to ensure this type of up-to-dateness of channel quality information. Therefore, reduction and/or compression techniques are required so as to transmit—for example—channel quality information only for a subset of resource blocks for a given user. In 3GPP LTE, the smallest unit for which channel quality is reported is called a sub-band, which consists of multiple (n) frequency-adjacent resource blocks (i.e. n Ng subcarriers).

Channel Quality Feedback Elements

In 3GPP LTE, there exist three basic elements which may or may not be given as feedback for the channel quality:
 Modulation and Coding Scheme Indicator (MCSI), which is also referred to as Channel Quality Indicator (CQI) in the 3GPP LTE specifications,
 Precoding Matrix Indicator (PMI) and
 Rank Indicator (RI)

The MCSI suggests a modulation and coding scheme that should be employed for downlink transmission to a reporting user equipment, while the PMI points to a precoding matrix/vector that is to be employed for multi-antenna transmission (MIMO) using an assumed transmission matrix rank or a transmission matrix rank that is given by the RI. Details on channel quality reporting and transmission mechanisms are can be found in 3GPP TS 36.212, "Evolved Universal Terrestrial Radio Access (E-UTRA); Multiplexing and channel coding (Release 8)", version 8.7.0, sections 5.2 and 3GPP TS 36.213, "Evolved Universal Terrestrial Radio Access (E-UTRA); Physical layer procedures (Release 8)", version 8.7.0, section 7.2 (all documents available at http://www.3gpp.org and incorporated herein by reference).

All of these elements are summarized as under the term channel quality feedback herein. Hence, a channel quality feedback can contain any combination of or multiple MCSI, PMI, RI values. Channel quality feedback reports may further contain or consist of metrics such as a channel covariance matrix or elements, channel coefficients, or other suitable metrics as apparent to those skilled in the art.

Triggering and Transmission of Channel Quality Feedback

In 3GPP LTE (Release 8) there are different possibilities defined, how to trigger the user equipments to send channel quality feedback on the downlink channel quality. Besides periodic CQI reports (see section 7.2.2 in 3GPP TS 36.213, version 8.7.0), there is also the possibility to use L1/L2 control signaling to a user equipment to request the transmission of the so-called aperiodic CQI report (see section 7.2.1 in 3GPP TS 36.213, version 8.7.0). This L1/L2 control signaling can also be used in the random access procedure (see section 6 in 3GPP TS 36.213, version 8.7.0, incorporated herein by reference). In both these cases, a special CQI request field/bit/flag is included in the control message from the eNodeB/relay node.

The L1/L2 control signaling that conveys information about an Uplink assignment is sometimes called UL-DCI (Uplink Dedicated Control Information). FIG. 4 shows an example of the DCI format 0 for FDD operation as defined in 3GPP TS 36.212, section 5.3.3.1.1 which serves to convey uplink DCI (please note that the CRC field of DCI format 0 is not shown in FIG. 4 for simplicity. The CQI request flag contains information whether the receiver should transmit CQI within the allocated uplink resources or not. Whenever such a trigger is received, the user subsequently transmits the feedback generally together with uplink data on the assigned Physical Uplink Shared CHannel (PUSCH) resources (the detailed procedure is described in section 7.2 et seq. in 3GPP TS 36.213, version 8.7.0).

Further Advancements for LTE—LTE-Advanced (LTE-A)

The frequency spectrum for IMT-Advanced was decided at the World Radiocommunication Conference 2007 (WRC-07) in November 2008. Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved which is also referred to as "Release 10". The study item covers technology components to be considered for the evolution of E-UTRA, e.g. to fulfill the requirements on IMT-Advanced. Two major technology components which are currently under consideration for LTE-A are described in the following.

In order to extend the overall system bandwidth, LTE-A (Release 10) uses carrier aggregation, where two or more component carriers are aggregated in order to support wider transmission bandwidths e.g. up to 100 MHz and for spectrum aggregation. It is commonly assumed that a single component carrier does not exceed a bandwidth of 20 MHz.

A terminal may simultaneously receive and/or transmit on one or multiple component carriers depending on its capabilities:
 An LTE-Advanced (Release 10) compatible mobile terminal with reception and/or transmission capabilities for carrier aggregation can simultaneously receive and/or transmit on multiple component carriers. There is one Transport Block (in absence of spatial multiplexing) and one HARQ entity per component carrier.
 An LTE (Release 8) compatible mobile terminal can receive and transmit on a single component carrier only, provided that the structure of the component carrier follows the Release 8 specifications.

It is also envisioned to configure all component carriers LTE (Release 8)-compatible, at least when the aggregated numbers of component carriers in the uplink and the downlink are same. Consideration of non-backward-compatible configurations of LTE-A component carriers is not precluded.

Channel Quality Feedback in LTE-A (Release 10)

As there is only one component carrier defined in LTE (Release 8), there is no ambiguity at the user equipment on which portion of the system bandwidth CQI reporting is to be done. The CQI request flag (together with the current transmission mode) is unambiguously indicating to the user equipment how to provide CQI feedback to the eNodeB.

With the introduction of carrier aggregation in LTE-A (Release 10) and assuming that the LTE (Release 8) CQI reporting procedures should be reused, there are different possibilities how a CQI request can be interpreted by the user equipment. As shown in FIG. 5, it may be generally assumed that UL-DCI (containing the CQI request) for uplink transmission that is transmitted from a eNodeB or relay node to a user equipment is placed within a single downlink component carrier. A simple rule to handle the CQI request at the user equipment would be that whenever a UL-DCI requests a CQI transmission by the user equipment, same applies to the downlink component carrier where the corresponding UL-DCI is transmitted. I.e. the user equipment would only send aperiodic CQI feedback in a given UL transmission for those downlink component carriers that comprised a UL-DCI requesting a CQI report at the same time.

An alternative handling of UL-DCI comprising a CQI request is shown in FIG. 6. Whenever a UL-DCI requests a CQI transmission by the user equipment, the user equipment applies said request to all downlink component carriers available for downlink transmission to the user equipment.

When downlink transmission can occur on multiple component carriers, an efficient scheduling and link adaptation depends on the availability of accurate and up-to-date CQI. However, in order to make efficient use of the control signaling and CQI transmission resources, it should be possible to control for how many and which component carriers a CQI is to be requested (from the network side) and transmitted (from the terminal side).

According to the first solution discussed above with respect to FIG. 5, in order to request CQI for multiple component carriers the number of component carriers for which CQI is requested is identical to the number of required transmitted UL-DCI messages. In other words, to request CQI for five component carriers it is required to transmit five times more UL-DCI messages than for the case of requesting CQI for just a single component carrier. This solution is therefore not very efficient from a downlink control overhead point of view. According to the second solution above illustrated in FIG. 6, a single uplink DCI message requests CQI for all component carriers. Therefore the downlink control overhead is very small. However, the resulting uplink transmission always requires a large amount of resources to accommodate the transmission of CQI for all component carriers, even though the network knows that it currently requires CQI only for a single selected component carrier. Therefore this is not efficient for the usage of uplink resources, and does not offer any flexibility for the number of requested component carrier CQI.

SUMMARY OF THE INVENTION

One object of the invention is to suggest a mechanism for triggering channel quality feedback from a mobile terminal where the downlink control signaling overhead for the selection of component carrier(s) to be reported on is minimized.

The object is solved by the subject matter of the independent claims. Advantageous embodiments of the invention are subject to the dependent claims.

One aspect of the invention is to suggest a new interpretation of a predetermined format for dedicated control information (also referred to as downlink control information) comprising a CQI request flag, which is depending on the status of the CQI request flag. In case the CQI request flag is set, i.e. is requesting the provision of channel quality feedback from the mobile terminal, at least one further bit of the dedicated control information is interpreted as information indicative of the one or more component carriers available for downlink transmission to the mobile terminal and the mobile terminal is providing channel quality feedback on the channel quality experienced on the indicated component carrier or component carriers. Furthermore, in an alternative implementation, the combination of the CQI request flag and the at least one further bit of the dedicated control information is used to indicate the one or more component carriers available for downlink transmission to the mobile terminal on which the mobile terminal is to provide channel quality feedback.

According to another, alternative aspect of the invention, the indication of the component carrier or component carriers the mobile terminal is requested to provide channel quality feedback on is indicated by the time and/or frequency resources on which the dedicated control information is received at the terminal and/or the transport format of the dedicated control information.

Both aspects may be combined, i.e. the indication of the component carrier(s) for which channel quality feedback is to be sent may be indicated to the mobile terminal by means of the resource (in the time and/or frequency domain) and/or transport format utilized for transmitting the dedicated control information, and in addition at least one further bit of the dedicated control information. In one example where the both aspects are combined, the at least one further bit of the dedicated control information may be the CQI request flag.

One embodiment of the invention is providing a method for reporting on a downlink channel quality (channel quality feedback) experienced by a terminal (e.g. a mobile terminal or a user equipment) by means of channel quality information for at least one of plural component carriers of a communication system available for downlink transmission to the terminal. According to this exemplary method the terminal receives dedicated control information having a predetermined format. The dedicated control information comprises a CQI request flag (first control information field) for requesting channel quality reporting by the terminal and at least one further, second control information field consisting of at least one bit. According to this embodiment of the invention, if the CQI request flag is set, the terminal is interpreting at least one bit of the second control information field as CQI control information indicative of one or more of the component carriers available for downlink transmission to the terminal on which the terminal is to report channel quality information, and transmits channel quality information for each indicated component carrier. Hence, in this exemplary embodiment, one or more control information fields of the dedicated control information can convey the CQI control information.

In one further exemplary embodiment, the terminal interprets the at least one second control information field according to the default specification of the predetermined format of the dedicated control channel information, if the CQI request flag is not set.

In alternative embodiment of the invention, the status of the CQI request flag is not decisive for the interpretation of the remaining fields within the dedicated control information. In this exemplary alternative embodiment of the invention a combination of at least one bit of the second control information field and the CQI request flag is unconditionally interpreted as the CQI control information indicative of one or more of the component carriers available for downlink transmission to the terminal on which the terminal is to report channel quality information.

Generally, the invention can be used in 3GPP-based communication systems, in particular in a 3GPP LTE-(Release 10) system. For example, in one implementation, the dedicated control information of the predetermined format is Dedicated Control Information of DCI format 0 defined in 3GPP LTE (Release 8).

The dedicated control information may be for example received via one of the plural component carriers of the communication system. In one further exemplary embodiment, the terminal is transmitting channel quality information for at least the component carrier on which the dedicated control information is received, if the CQI request flag is set within the dedicated control information. In a more specific example, the at least one bit of the second control information field interpreted as CQI control information indicates at least one further component carrier of the plural component carriers other than the component carrier on which the dedicated control information has been received.

There are different possibilities which fields of the dedicated control information' predetermined format are used to indicate the CQI control information. In an embodiment of the invention, the at least one bit of the at least one second control information field interpreted as the CQI control information is one of or a combination of:
 a hopping flag defined for the predetermined format of the dedicated control channel information indicating whether or not the terminal should employ uplink resource hopping,
 at least one padding bit defined for the predetermined format of the dedicated control channel information for aligning the size of the dedicated control information to a predetermined number of bits,
 at least one bit of a resource assignment field defined for the predetermined format of the dedicated control channel information for assigning resources to the terminal,
 at least one bit of a DMRS field defined for the predetermined format of the dedicated control channel information for configuring the cyclic shift between the terminal and another terminal for uplink transmission on at least partly overlapping uplink resources, and
 at least one bit of an uplink carrier indicator field defined for the predetermined format of the dedicated control channel information for indicating to the terminal for which component carrier or component carriers the dedicated control information is valid.

In one exemplary embodiment of the invention, the dedicated control information consists of:
 an uplink carrier indicator field defined for said predetermined format of the dedicated control channel information for indicating to the terminal for which component carrier the dedicated control information is valid,
 a format flag for distinguishing different formats of dedicated control information having the same number of bits/size, wherein the format flag is set to zero,
 a hopping flag for indicating whether or not the terminal should employ uplink resource hopping,
 a resource block assignment field assigning uplink resources on an uplink component carrier to the terminal,
 a modulation and coding scheme field that is indicating the modulation scheme, coding rate and the redundancy version for the transmission on the assigned resources on the uplink component carrier,
 a new data indicator to indicate whether the terminal has to send new data or a retransmission,
 a DMRS field for configuring the cyclic shift applied to the reference symbol sequence,
 said CQI request flag, and
 optionally one or more padding bit(s) to align the size of the dedicated control information to a predetermined number of bits.

Please note that in one exemplary implementation, the fields of the dedicated control information are provided in the order stated above. In another implementation, the order of the fields is as stated above, with the exception that the CQI request flag follows the uplink carrier indicator field, the format flag or the hopping flag, or resides in any position that does not depend on variable parameters such as the system bandwidth or the number of fields within the dedicated control information.

In another embodiment of invention, it is assured that the CQI control information indicate at least a first channel quality feedback option, where the terminal provides cannel quality feedback for one available component carrier and a second channel quality feedback option, where the terminal provides channel quality feedback on all available component carriers. Accordingly, in an exemplary implementation, a first value of the at least one bit of the at least one second control information field interpreted by the terminal as CQI control information is requesting the terminal to provide channel quality information for one available downlink component carrier of the plurality of component carriers and a second value of the at least one bit of the at least one second control information field interpreted by the terminal as CQI control information is requesting the terminal to provide channel quality indices for all downlink component carriers of the plurality of component carriers available for downlink transmission to the terminal.

In one further embodiment of the invention the second control information field of the dedicated control information is a carrier indicator field which, if said CQI request flag is set, is indicative of the CQI control information, and may be optionally further indicative of an uplink component carrier on which the dedicated control information assigns uplink resources. As stated before, the CQI control information indicates one or more of the component carriers available for downlink transmission to the terminal for which the terminal is to report channel quality information.

In a variation of this embodiment, a first subset of the values that can be signaled in the carrier indicator field indicates that the terminal is to report channel quality information for the downlink component carrier on which the dedicated control information is received by the terminal, and a second subset of the values that can be signaled in the carrier indicator field indicates that the terminal is to report channel quality information for all downlink component carriers of the plurality of component carriers available for downlink transmission to the terminal at the time of receiving the dedicated control information.

In a further variation of the embodiment, there is third subset of the values that can be signaled in the carrier indicator field which indicates that the terminal is to report channel quality information for at least one downlink component carrier according to a semi-static configuration. This semi-static configuration may for example be configured by means of RRC signaling.

In another variation of the embodiment, the carrier indicator field indicates that the uplink component carrier is a linked uplink component carrier linked to the downlink component carrier on which the dedicated control information is received, and further indicates to the terminal to report channel quality information on one of or all downlink component carriers. This "link" between the linked uplink component carrier and the corresponding downlink component carrier could be for example pre-configured.

In another embodiment of the invention, the values that can be signaled in the carrier indicator field further indicate a respective uplink component carrier on which the dedicated control information assigns uplink resources.

Furthermore, the dedicated control information can be provided to the terminal using different messages and channels. In one exemplary embodiment, the dedicated control information is received by the terminal via a Physical Downlink Control CHannel (PDCCH). In another exemplary embodiment of the invention, the dedicated control information is comprised in a random access response grant message during non-contention based random access.

In accordance with the second aspect mentioned above, the invention is also providing another embodiment related to another method for reporting on a downlink channel quality (channel quality feedback) experienced by a terminal by means of channel quality information for at least one of plural component carriers of a communication system available for downlink transmission to the terminal. In this method, the terminal receives dedicated control information having a predetermined format, wherein the dedicated control information comprises a CQI request flag for requesting channel quality reporting by the terminal. In this exemplary embodiment, if the CQI request flag is set, the terminal interprets time and/or frequency resources on which the dedicated control information is received at the terminal and/or the transport format of the dedicated control information as CQI control information indicative of one or more of the component carriers available for downlink transmission to the terminal on which the terminal is to report channel quality information, and transmits channel quality information for each indicated component carriers.

It should be noted that this solution is also applicable to situations, where the status of the CQI request flag is having no influence on the interpretation of the content of the dedicated control information. For example, in another embodiment, the dedicated control information are interpreted by the terminal according to the predetermined format, and the terminal interprets time and/or frequency resources on which the dedicated control information is received at the terminal and/or the transport format of the dedicated control information as CQI control information indicative of one or more of the component carriers available for downlink transmission to the terminal on which the terminal is to report channel quality information, and transmits channel quality information for each indicated component carriers In another embodiment of the invention in line with the second aspect of the invention mentioned above, the dedicated control information comprises at least one further, second control information field consisting of at least one bit, and in the step of interpreting interprets:

at least one bit of the at least one further, second control information field and the time and/or frequency resources on which the dedicated control information is received at the terminal and/or the transport format of the dedicated control information as CQI control as the CQI control information indicative of one or more of the component carriers available for downlink transmission to the terminal on which the terminal is to report channel quality information. Hence, the different embodiments of the invention in line with the two aspects of the invention discussed above can be readily combined.

The invention according to another embodiment is also providing a mobile terminal for reporting on a downlink channel quality experienced by the terminal by means of channel quality information for at least one of plural component carriers of a communication system available for downlink transmission to the mobile terminal. The mobile terminal comprises a receiver for receiving dedicated control information having a predetermined format. The dedicated control information comprises a CQI request flag for requesting channel quality reporting by the terminal and at least one further, second control information field consisting of at least one bit.

Furthermore, the mobile terminal further comprises a processing unit for interpreting, if the CQI request flag is set, at least one bit of the second control information field as CQI control information indicative of one or more of the component carriers available for downlink transmission to the terminal on which the terminal is to report channel quality information, and a transmitter for transmitting channel quality information for each indicated component carrier.

Another alternative embodiment of the invention is related to a mobile terminal for reporting on a downlink channel quality experienced by the terminal by means of channel quality information for at least one of plural component carriers of a communication system available for downlink transmission to the mobile terminal. This mobile terminal comprises a receiver for receiving dedicated control information having a predetermined format, wherein the dedicated control information comprises a CQI request flag for requesting channel quality reporting by the terminal, a processing unit for interpreting, if the CQI request flag is set, time and/or frequency resources on which the dedicated control information is received at the terminal and/or the transport format of the dedicated control information as CQI control information indicative of one or more of the component carriers available for downlink transmission to the terminal on which the terminal is to report channel quality information, and a transmitted for transmitting channel quality information for each indicated component carrier.

The mobile terminal according to another embodiment of the invention, is further adapted (e.g. by comprising respective operational units or means) to perform the steps of the methods for terminal for reporting on a downlink channel quality experienced by the terminal according to one the different embodiments and aspects of the invention discussed herein.

Further, according to another embodiment, the invention also provides a computer readable medium storing instructions that, when executed by the processor of a terminal, cause the terminal to report on a downlink channel quality experienced by the a terminal by means of channel quality information for at least one of plural component carriers of a communication system available for downlink transmission to the terminal, by receiving dedicated control information having a predetermined format, wherein the dedicated control information comprises a CQI request flag for requesting channel quality reporting by the terminal and at least one further, second control information field consisting of at least one bit, interpreting at least one bit of the second control information field as CQI control information indicative of one or more of the component carriers available for downlink transmission to the terminal on which the terminal is to report channel quality information, if the CQI request flag is set, and transmitting channel quality information for each indicated component carrier.

A computer readable medium storing instructions that, when executed by the processor of a terminal, cause the terminal to report on a downlink channel quality experienced by the a terminal by means of channel quality information for at least one of plural component carriers of a communication system available for downlink transmission to the terminal, by receiving by the terminal dedicated control information having a predetermined format, wherein the dedicated control information comprises a CQI request flag for requesting channel quality reporting by the terminal, interpreting, if the CQI request flag is set, time and/or frequency resources on which the dedicated control information is received at the terminal and/or the transport format of the dedicated control information as CQI control information indicative of one or more of the component carriers available for downlink transmission to the terminal on which the terminal is to report channel quality information, and transmitting channel quality information for each indicated component carrier.

The computer readable media according to another embodiment of the invention can further store instructions, that when executed by the processor of the mobile terminal, cause the mobile terminal to perform the steps of the methods for terminal for reporting on a downlink channel quality experienced by the terminal according to one the different embodiments and aspects of the invention discussed herein.

Further embodiments of this invention related to the operation of the network node in the access network of a communication system that is triggering the aperiodic channel quality feedback of the terminal on at least one component carrier available for downlink transmission to the terminal. Such node may be for example a base station, eNodeB or relay node. According to one of these exemplary embodiments the node in the access network of the communication system selects at least one component carrier available for downlink transmission to the mobile terminal out of a plurality of component carriers configured in the communication system, and transmits to the mobile terminal dedicated control information comprising a CQI request flag that is set by the node in order to trigger aperiodic channel quality feedback and at least one further, second control information field at least one bit of which is set to indicate the selected at least one component carrier. In response to this dedicated control information the node receives channel quality feedback on each selected component carrier from the mobile terminal.

In a further embodiment of the invention the node may be further equipped with a scheduler that is scheduling downlink transmissions to the mobile terminal on the based on the available component carrier or carriers based on the channel quality feedback received from the mobile terminal. Furthermore, in a more detailed exemplary implementation, the node in the access network may receive channel quality feedback from other mobile terminals than said mobile terminal and schedules the other mobile terminals and said mobile terminal based on the channel quality feedback received from the other mobile terminals and said mobile terminal.

Another embodiment of the invention relates to a computer readable medium storing instructions that, when executed by a processor of a node in an access network of a communication system, cause the node to trigger aperiodic channel quality feedback of a terminal on at least one component carrier available for downlink transmission to the terminal in the communication system, by selecting at least one component carrier available for downlink transmission to the mobile terminal out of a plurality of component carriers configured in the communication system, transmitting to the mobile terminal dedicated control information comprising a CQI request flag that is set by the node in order to trigger aperiodic channel quality feedback and at least one further, second control information field at least one bit of which is set to indicate the selected at least one component carrier and receiving from the mobile terminal, in response to the dedicated control information, channel quality feedback on each selected component carrier.

BRIEF DESCRIPTION OF THE FIGURES

In the following the invention is described in more detail in reference to the attached figures and drawings. Similar or corresponding details in the figures are marked with the same reference numerals.

FIG. 4 shows the format "DCI format 0" of dedicated control information (DCI) according to 3GPP LTE (Release 8) for FDD operation, FIG. 7 shows the format "DCI format 0" of dedicated control information (DCI) according to 3GPP LTE (Release 8) for FDD operation, when frequency hopping is activated, FIGS. 8 to 12 show different interpretations of the content of dedicated control information (DCI) according to "DCI format 0" of 3GPP LTE (Release 8) for FDD operation, when reusing the format in 3GPP LTE-A (Release 10) system, FIGS. 13 to 17 show different formats of dedicated control information (DCI) according to different embodiments of the invention, when considering the interpretations of FIGS. 8 to 12 as individual formats of the dedicated control information, FIG. 19 shows an exemplary format for dedicated control information according to an embodiment of the invention, FIGS. 22 & 23 show two exemplary formats for dedicated control information according to further embodiments of the invention.

DETAILED DESCRIPTION OF THE INVENTION

Figure 1:
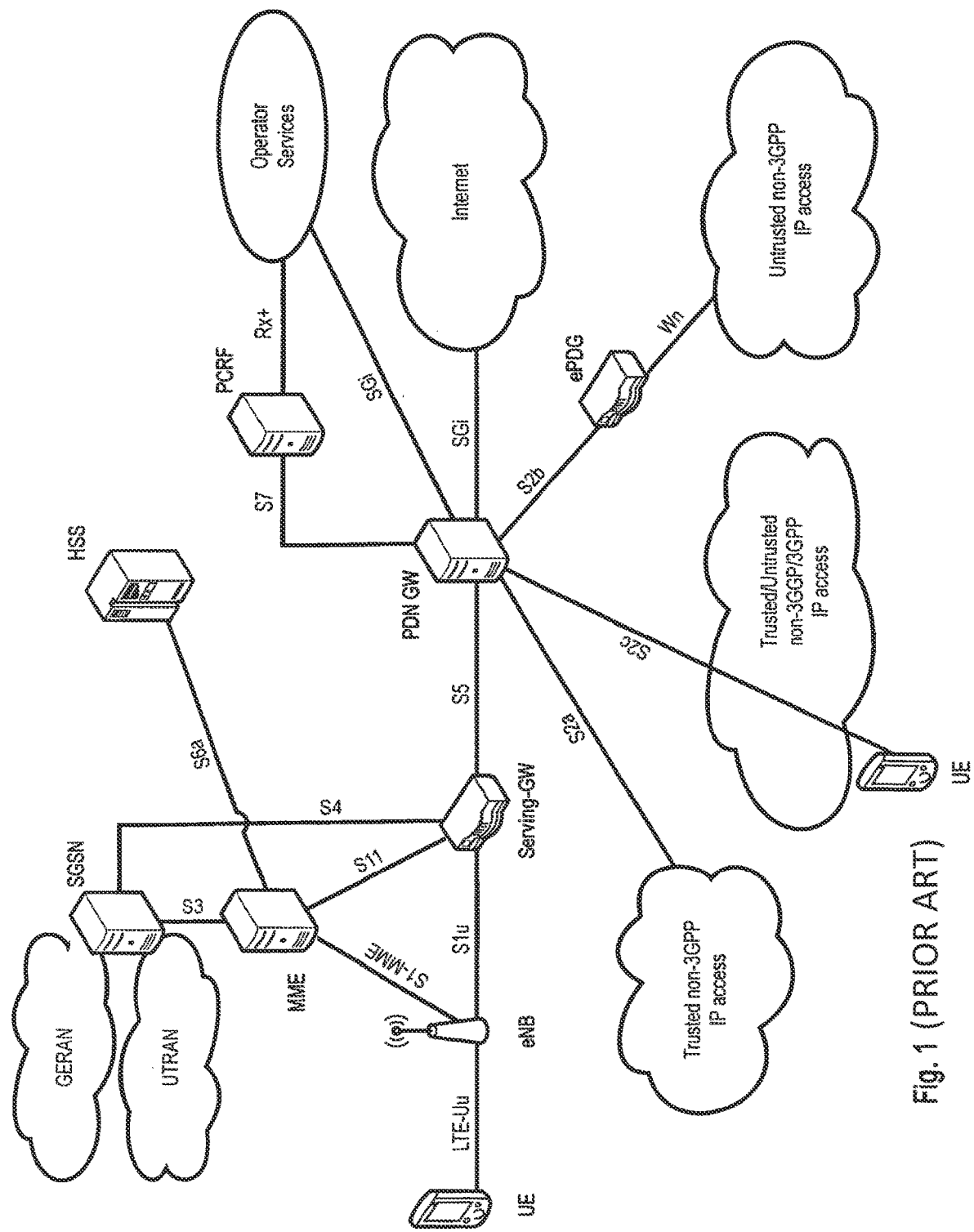
FIG. 1 shows an exemplary architecture of a 3GPP LTE system.
Figure 2:
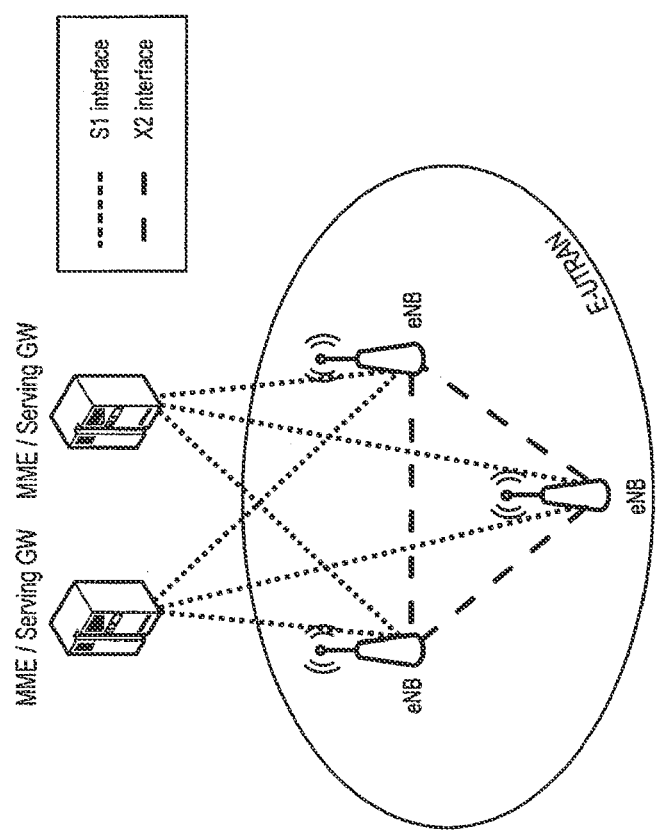
FIG. 2 shows an exemplary overview of the overall E-UTRAN architecture of LTE.
Figure 3:
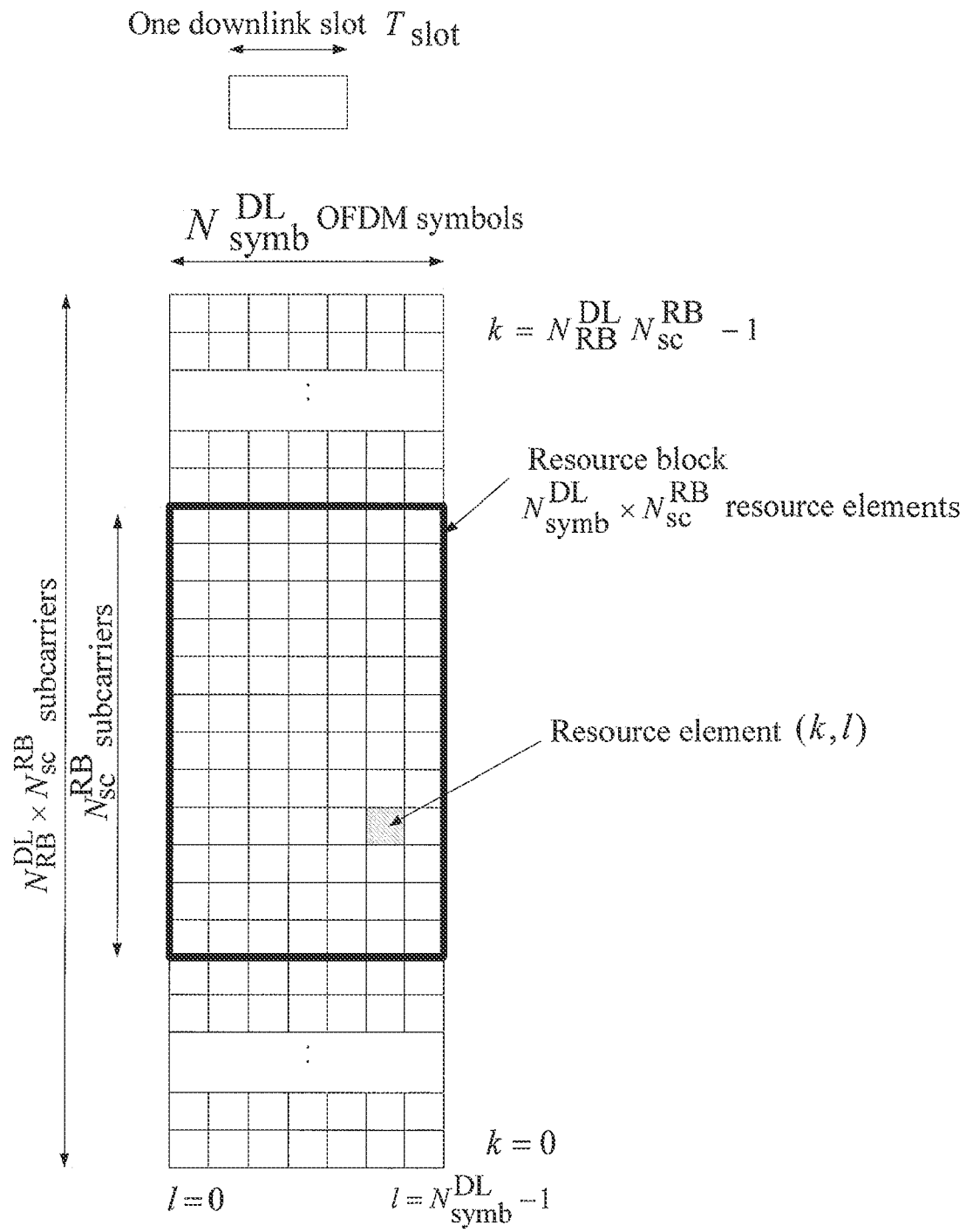
FIG. 3 shows an exemplary downlink resource grid as defined for 3GPP LTE (Release 8)
Figure 5:
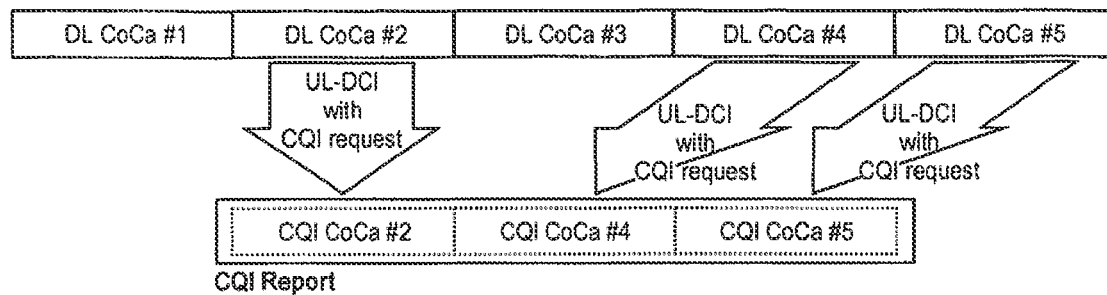
FIGS. 5 & 6 show exemplary solutions for triggering aperiodic CQI reporting from a user equipment in a 3GPP LTE-A (Release 10) system.
Figure 6:
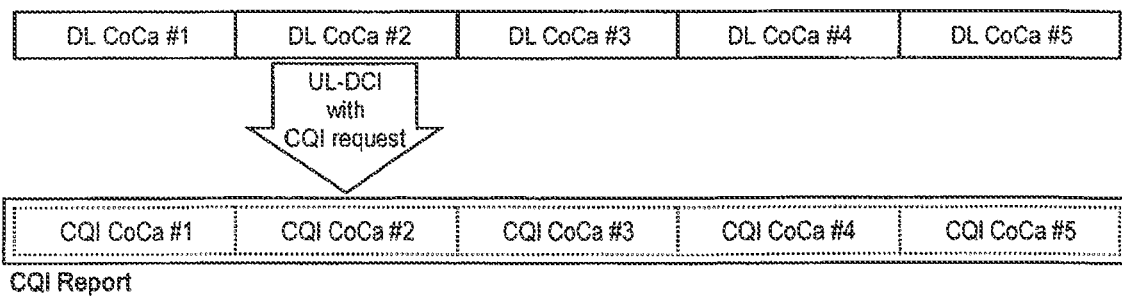
Figure 10:
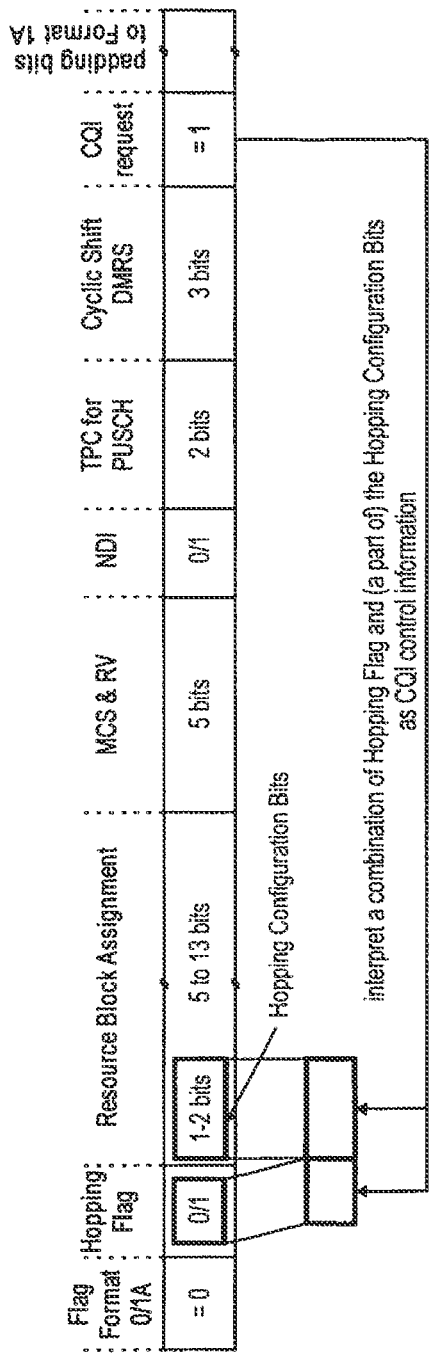

The following paragraphs will describe various embodiments of the invention. For exemplary purposes only, most of the embodiments are outlined in relation to an orthogonal single-carrier uplink radio access scheme according to 3GPP LTE (Release 8) and LTE-A (Release 10) mobile communication systems discussed in the Technical Background section above. It should be noted that the invention may be advantageously used for example in connection with a mobile communication system such as 3GPP LTE (Release 8) and LTE-A (Release 10) communication systems previously described, but the invention is not limited to its use in this particular exemplary communication network.

The explanations given in the Technical Background section above are intended to better understand the mostly 3GPP LTE (Release 8) and LTE-A (Release 10) specific exemplary embodiments described herein and should not be understood as limiting the invention to the described specific implementations of processes and functions in the mobile communication network. Nevertheless, the improvements to the random access procedure proposed herein may be readily applied in the architectures/systems described in the Technical Background section and may in some embodiments of the invention also make use of standard and improved procedures of theses architectures/systems.

As indicated in the Summary of Invention section, one aspect of this invention is to suggest a new interpretation of a predetermined format for dedicated control information comprising a CQI request flag. The CQI request flag is a flag (e.g. 1 bit) that is used to request a terminal receiving the dedicated control information to provide channel quality feedback. The interpretation of the content of the dedicated control information may or may not depend on the status of the CQI request flag, depending on the implementation. In one exemplary implementation, the predetermined format of the dedicated control information is the "DCI format 0" as defined for 3GPP LTE (Release 8) that is interpreted in a different manner depending on the status of at least the CQI request flag comprised therein. FIG. 4 exemplarily shows the "DCI format 0" as defined for 3GPP LTE (Release 8) for the FDD operation.

As indicated above, in some exemplary embodiment of the invention that will be outlined in the following in more detail, the status of the CQI request flag comprised in the dedicated control information according the predetermined dedicated control information format is determining how the remaining content of the dedicated control information is interpreted by the terminal. The terminal may be for example a mobile terminal, a user equipment or a relay node. To put this differently, in these examples, the CQI request flag could also be considered a format identification: In case the CQI request flag is not set, the content of the dedicated control information is interpreted as defined for the predetermined format. In case the CQI request flag is set, the dedicated control information is not interpreted as defined for the predetermined format, i.e. has a different format than the predetermined format.

In case the CQI request flag is set, at least one further bit of the dedicated control information for uplink transmission is interpreted by a terminal receiving the dedicated control information as information indicative of the one or more component carriers available for downlink transmission to the terminal and the terminal is providing channel quality feedback on the channel quality experienced on the indicated component carrier or component carriers. This at least one further bit that can be considered as CQI control information could correspond to

- a part or parts of one or more control information fields comprised in the dedicated control information according to the definition of the predetermined format, or
- one or more control information fields comprised in the dedicated control information according to the definition of the predetermined format, or
- a mixture between a part or parts of and entire control information fields comprised in the dedicated control information according to the definition of the predetermined format.

In one example, the control information field or fields (part or parts of which are) interpreted as CQI control information include a hopping flag, a resource assignment field, a DMRS field, an uplink carrier indicator field and padding bits. When implementing the invention in an LTE-A (Release 10) system, the number of padding bits within the dedicated control information may depend on the system's bandwidth. In typical scenarios, one can expect that there are 0, 1 or 2 padding bits (depending on the system bandwidth).

In another alternative exemplary implementation, the combination of the CQI request flag and the at least one further bit of the dedicated control information is used to indicate the one or more component carriers available for downlink transmission to the terminal on which the terminal is to report channel quality feedback. Hence, in this example, the interpretation of the dedicated control information may not depend on the status of the CQI request flag. Instead, a combination of the CQI request flag and at least a part of at least one further control information field indicates the one or more component carriers available for downlink transmission to the terminal and the terminal is providing channel quality feedback on the channel quality experienced on the indicated component carrier or component carriers According to another, alternative aspect of the invention, the indication of the component carrier or component carriers the terminal is requested to provide channel quality feedback on is indicated by the time and/or frequency resources on which the dedicated control information is received at the terminal and/or the transport format of the dedicated control information. For example, it can be assumed that the one or more control channel elements onto which the dedicated control information for a terminal is mapped is/are themselves mapped to the physical resources of one or more component carriers for downlink transmission according to different patterns. Each pattern could thereby indicate a combination of component carriers (at least one) available for downlink transmission to the terminal on which the terminal is to provide channel quality feedback.

Generally, it should be noted that "available" in formulations like "component carriers available for downlink transmission" or "available component carriers" should refer to the fact that there may be more component carriers configured or existing in the system than at a given point of time used for downlink transmission to the terminal. Available in this context refers to the component carriers actually used for downlink transmission to the terminal.

Available component carriers may therefore be one of:
- all component carriers that the base station (e.g. eNodeB or relay node) can use for conveying data on the downlink to the terminal (e.g. user equipment),
- all component carriers that a terminal assumes for reception of data (e.g. this may be configured individually per terminal by the network/eNodeB/relay node using higher-layer signaling such as RRC signaling),
- all component carriers where a terminal detects reception of data,
- all component carriers that a terminal is configured to consider for channel quality feedback reporting (which may be a superset or subset of the component carriers in the preceding bullet point, and which can be configured using higher-layer signaling such as RRC signaling)
- all component carriers that are within the reception capability of the receiver (this is mostly related to hardware restrictions or capabilities of the terminal, such as radio frequency circuitry complexity and power consumption)

Typically, terminals that are most suitable for a high data rate in the downlink are those that are close to the transmitter ("cell-centre") and that do not move fast, i.e. where the channel characteristics of the downlink barely fluctuate over a certain time. The reason is that for cell-centre terminals, the available transmission power can be very efficiently used for high code rates (close to rate r=1) or high-order modulation schemes (such as 64-QAM), and for slowly moving terminals, the channel characteristics is nearly constant over time. This means that one can also assume that channel quality feedback of such slow-moving terminal that has been reported has a very long validity, allowing a very accurate and efficient link adaptation.

Accordingly, in order to exploit the capability of those slow-moving, cell-centre terminals, it is advantageous to configure same to use component carrier aggregation, i.e. to use multiple component carriers at least for downlink transmissions. Generally it can be assumed that higher layer configuration or semi-static configuration is available to the network, so that a node in the access network is able to configure a terminal to operate in a single or multiple component carrier transmission/reception mode. The terminal is thus aware of whether or not multiple component carriers are available in the downlink so that it can judge whether a dedicated control information for an uplink transmission where the CQI request flag is set must be interpreted as a request to provide channel quality feedback for a single downlink component carrier (only one component carrier is available) or as a request for channel quality feedback on one or more of the multiple downlink component carriers identified within the dedicated control information (multiple component carriers are available). Accordingly, depending on the number of downlink component carriers configured for a terminal, the terminal interprets the dedicated control information differently.

Similarly, the access network node (typically a base station, eNodeB or relay node) is also aware of the number of downlink component carriers that have been configured for the terminal and may therefore control the channel quality feedback reporting behavior of the terminal accordingly (e.g. by setting the CQI request flag, or by signaling the dedicated control information according to special pattern on time and/or frequency resources, as will be explained further down below). Hence, the access network node can request channel quality feedback from the terminals so as to properly schedule downlink transmissions to the respective terminals.

Figure 18:
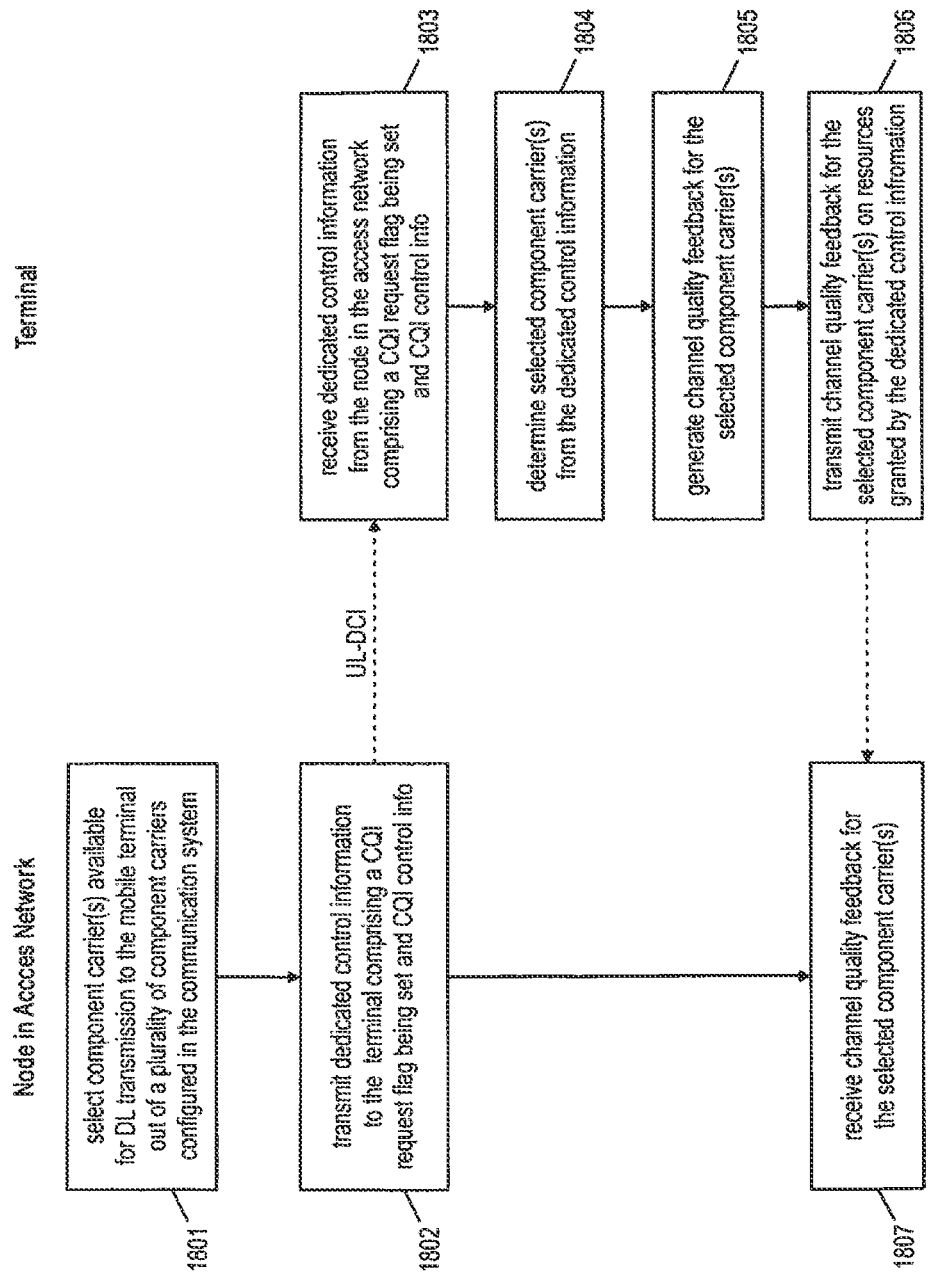
FIG. 18 shows flow chart of an exemplary operation of a node in the access network and a terminal according to an embodiment of the invention

FIG. 18 shows a flow chart of an exemplary operation of a node in the access network and a terminal according to an embodiment of the invention. The node of the access network (or access network node) is for example a base station in the access network of a mobile communication system. In a 3GPP-based communication system, such as LTE-A, a base station is also referred to as an eNodeB or relay node. Furthermore, the terminal may be for example a mobile terminal such as a user equipment in a 3GPP-based communication system. Please note that the terminal may also be a relay node as far as communication between an eNodeB and a relay node are concerned.

The terminal and the node may for example communicate with each other via an air interface. The system bandwidth available for communication may be considered to be divided into a plurality of component carriers. For example, the system bandwidth could be for example divided into 2, 3, 4 or 5 component carriers.

The operation of the node of the access network is shown on the left hand side of FIG. 18. The node first selects 1801 one or more component carriers available for downlink transmission to the terminal on which it desires to receive channel quality feedback. Based on the selection of component carrier(s) the node further transmits 1802 dedicated control information to the terminal that include an indication of the selected component carrier(s) on which the terminal is to provide channel quality feedback. As will be outlined in more detail below, there exist numerous possibilities how the selected component carrier(s) can be indicated to the terminal. The dedicated control information also comprises a resource allocation on the uplink for the terminal, on which the terminal is to send the channel quality feedback. Therefore the dedicated control information may also be referred to as an uplink grant.

It is assumed for exemplary purposes in FIG. 18 that the dedicated control information has a predetermined format and comprises a CQI request flag being set in order to trigger aperiodic channel quality feedback from the terminal and CQI control information (CQI control info) that is indicating which component carrier(s) have been selected, respectively on which component carrier(s) the terminal is to report. As will be outlined in more detail below, there exist numerous possibilities how the selected component carrier(s) can be indicated to the terminal by means of the CQI control information comprised in the dedicated control information.

The terminal receives 1803 transmission of the dedicated control information from the node of the access network on downlink. The dedicated control information may be transmitted via a control channel to the terminal. In this example, the terminal checks whether the CQI request flag is set in the dedicated control information. If the CQI request flag is not set, the terminal would interpret the contents of the dedicated control information using the standard definition of the dedicated control channel information format used.

If the CQI report flag is set, i.e. is requesting channel quality feedback from the terminal, the terminal will interpret the content of the dedicated control information differently than in the case where the CQI request flag is not set. More specifically, if the CQI report flag is set, the terminal will interpret at least a part/one bit of at least one further field comprising control information (second control information field) within the dedicated control information as the CQI control information and will determine 1804 the CQI control information indicating the access network node selection of the component carrier(s) to provide channel quality feedback for. Next, the terminal generates 1805 a channel quality feedback message identifying the channel quality experienced by the terminal on the selected component carrier(s) indicated within the dedicated control information received from the access network node. This could for example involve that the terminal is performing some channel quality measurement on the selected component carrier(s). In a more detailed exemplary implementation, the terminal determines a SINR or channel covariance measurement, based on e.g. the reception of so-called reference symbols, for the selected component carrier(s) and may optionally further convert the measurement results into channel quality feedback, such as for example an MCSI or Channel Quality Indicator (CQI) as in an LTE or LTE-A specifications, a PMI or RI. Channel quality feedback may also be provided in form of directly measured or measurement-derived metrics such as a channel covariance matrix or elements, channel coefficients, or other suitable metrics.

The terminal transmits 1806 a message containing the channel quality feedback for the selected component carrier(s) to the node in the access network, which receives the message and extracts the channel quality feedback information. The terminal sends the channel quality feedback on the selected component carrier(s) indicated in the dedicated control information on the uplink resources that are also indicated in the dedicated control information. Optionally, the terminal may multiplex the channel quality feedback and further control or user data in this transmission. The node may store the obtained channel quality feedback and may make the channel quality feedback available to a scheduler (which could be located in the node) so that the downlink channel quality experienced by the terminal on the selected component carrier(s) can be considered in the scheduling of the terminal, i.e. in the process of deciding on the allocation of physical downlink or uplink resources to the terminal.

Although FIG. 18 shows only the triggering and transmission of channel quality feedback from a single terminal, it should be noted that the access network node may of course serve multiple terminals. Accordingly, the access network node may request multiple terminals to provide (aperiodic) channel quality feedback on the downlink component carries available to the respective terminals. Furthermore, the access network node may schedule not only one terminal, but may schedule multiple terminals in a resource assignment process taking into account the channel quality experienced by the different terminals on the different component carriers of the system in its scheduling decision.

In a more detailed exemplary embodiment of the invention, it may be assumed that the procedure shown in FIG. 18 is implemented in a 3GPP LTE-A (Release 10) communication system. In this exemplary embodiment, the node of the access network may be an eNodeB or a relay node. The terminal is a user equipment (UE). The eNodeB selects the component carrier(s) on which the user equipment is to report channel quality feedback and indicates its selection to the user equipment by means of L1/L2 control signaling on the PDCCH.

More specifically, the L1/L2 control signaling is comprising dedicated control information (DCI) that comprises a trigger of aperiodic channel quality feedback by the user equipment, e.g. by means of the CQI report flag, and an indication of the component carrier(s) for which channel quality feedback, e.g. by means of a so-called CQI report, is requested. This indication of the component carrier(s) is the CQI control information that may also be referred to as a CQI carrier indicator field (CQI-CI) of the uplink dedicated control information.

In one further more detailed exemplary implementation the employed dedicated control information has one of a plurality of predetermined formats, e.g. the DCI format 0 as defined for LTE (Release 8) and an exemplary structure of which is shown in FIG. 4 and FIG. 7 in case of operating the LTE-A (Release 10) communication system in FDD mode. In this case the CQI-CI may be for example composed of part(s) of one or more control information fields that already exist in the DCI format 0 of Release 8.

As shown in FIG. 4 and FIG. 7, the UL-DCI for FDD consists of:
- a format flag (Flag Format 0/1A) for distinguishing DCI Format 0 and DCI format 1A, which are defined to have the same number of bits/size,
- a hopping flag (Hopping Flag) indicating whether or not the user equipment should employ uplink resource hopping,
- a resource block assignment field assigning uplink resources on the PUSCH to the user equipment (when triggering aperiodic channel quality feedback, the channel quality feedback and optionally further user data is multiplexed and transmitted on these assigned resources via that PUSCH),
- a modulation and coding scheme field (MCS&RV) that is indicating the modulation scheme, coding rate and the redundancy version for the transmission on the assigned resources on the PUSCH,
- a new data indicator (NDI) to indicate whether the user equipment has to send new data or a retransmission,
- a DMRS field (Cyclic Shift DMRS) for configuring the cyclic shift applied to the reference symbol sequence,
- a CQI request flag for triggering an aperiodic channel quality feedback report from the user equipment, and
- if required one or more padding bit(s) to align the size of the dedicated control information to a predetermined number of bits.

If the hopping flag is set, the first 1 or 2 bits of the resource block assignment field are used to indicate the hopping sequence or hopping configuration to the user equipment. This means that the resource block assignment field has 1 or 2 bits less, and may therefore only indicate a smaller resource block allocation size.

Another possibility according to another embodiment of the invention is to reuse the definition of DCI format 0 as defined for LTE (Release 8) and to extend same for the use in LTE-A (Release 10), i.e. to define a new DCI format 0 for the use in LTE-A (Release 10) based on DCI format 0 as defined for LTE (Release 8). Such an exemplary DCI format 0 for LTE-A (Release 10) according to one embodiment of the invention is shown in FIG. 19. In LTE (Release 8) there is only one component carrier defined, so that there is no question for which component carrier an uplink or downlink resource assignment is pertaining to.

When using multiple component carriers, the association between the resource assignment and the component carrier(s) for which it should be valid is not self-evident. When reusing the DCI format 0 as defined for LTE (Release 8) in a multiple-component carrier system like LTE-A (Release 10), the user equipment may for example assume that the resource allocation in the dedicated control information is pertaining to the downlink component carrier on which the dedicated control information is received (for downlink resource assignment), respectively, an uplink component carrier associated (linked) to the downlink component carrier on which the dedicated control information is received (for uplink resource assignments). Alternatively, in this embodiment and as shown in FIG. 19, the DCI format 0 as defined for LTE (Release 8) can be extended by an uplink carrier indicator field (UCI) for indicating to the user equipment for which component carrier or component carriers the dedicated control information is valid. It should be noted that the uplink carrier indicator field (UCI) can be placed also on other locations within the exemplary DCI format 0 for LTE-A (Release 10). Assuming that only one component carrier can be indicated by the uplink carrier indicator field (UCI) and the system may be configured with up to five component carriers, the uplink carrier indicator field (UCI) should have a size of 1, 2 or 3 bits, depending on the number of available or existing component carriers. If the uplink carrier indicator field (UCI) should be able to indicate arbitrary combinations of the valid or existing component carriers for which the dedicated control information is valid, the number of bits required for the uplink carrier indicator field is upper-bounded by $\lceil \log_2 N_{oC} \rceil$, where NoC is the number of different combinations of component carriers being possible.

It should be also noted that the invention may also be implemented in a LTE-A (Release 10) communication system operating in TDD mode. In this case the dedicated control information for the uplink (UL-DCI) according to DCI format 0 as defined for LTE (Release 8) or LTE-A (Release 10)—according to the exemplary embodiment in the paragraphs above—further comprises an uplink index field (UL index) or a Downlink Assignment Index (DAI) field (see 3GPP TS 36.212, version 8.7.0, section 5.3.3.1.1 and 3GPP TS 36.213, version 8.7.0, sections 5.1.1.1, 7.3 and 8 incorporated herein by reference).

In the following several exemplary embodiments of the invention are described with respect to FIGS. 8 to 17 that are intended to exemplify how the CQI control information may be comprised into the dedicated control channel information. Please note that for exemplary purposes, the different examples are based on a reuse of DCI format 0 defined for dedicated control information in LTE (Release 8) that has been discussed previously. Nevertheless, the exemplary embodiments may equally make use—for example—of the format for dedicated control information as shown in FIG. 19 or of other dedicated control information formats. In all embodiments, it may be assumed that the user equipment has already been configured to use component carrier aggregation, i.e. there are plural component carriers available for downlink transmission to a particular user equipment.

In one embodiment of the invention, the dedicated control information comprises a CQI request flag and at least a hopping flag. The "hopping" flag (typically 1 bit) is included to determine whether a user equipment should employ uplink resource hopping for transmission. The main merit of employing hopping is to obtain frequency diversity, i.e. to exploit different channel and/or interference characteristics to be more robust against instantaneous and limited Signal to Interference-plus-Noise Ratio (SINR) fluctuations in time or frequency. Such fluctuations can for example occur if the user equipment is moving at a high speed, or when it is in a radio channel scenario where the impulse response results in a very frequency-selective transmission characteristic, or when it is close to a radio cell boundary where generally the interference experienced from other user equipments in the same or adjacent cell can be relatively high compared to the received signal power from the target user equipment.

In general, a downlink transmission using multiple component carriers at the same time is interesting to increase the instantaneous data rate for a user equipment. Traditionally, the user equipments which are most suitable for a high data rate are those that are close to the transmitter ("cell-centre") and that do not move fast, i.e. where the channel characteristics barely fluctuate over a certain time. The reason is that for cell-centre user equipments, the available transmission power can be very efficiently used for high code rates (close to rate r=1) or high-order modulation schemes (such as 64-QAM), and for slowly moving user equipments, the channel is nearly constant over time, such that a CQI that is reported has a very long validity, allowing a very accurate and efficient link adaptation. It should be understood that even though the terms "cell-centre" and "cell boundary" are originating from the geographical position of the terminal with respect to the position of the radio network element (such as an eNodeB or relay node), the term "cell centreTcell boundary" also refers to a terminal that faces generally/on average good/bad radio conditions, respectively. This is not only a function of the geographical distance but also of e.g. the existence of obstacles that block a line-of-sight connection between the two ends of the radio communication. Therefore, even a terminal that has a very small Euclidean distance to an eNodeB or relay node could be considered to be in a cell boundary environment, if the transmission path(s) are blocked by obstacles such as walls, buildings, vegetation, metal shields, and the like.

Consequently, slow moving cell-centre user equipments are traditionally not associated with conditions where uplink hopping is required. Therefore the Hopping flag (and consequently the Hopping configuration bits—see FIG. 4 and FIG. 7) are rarely activated/employed, if ever, when CQI for multiple component carriers is requested. Generally, higher layer or semi-static configuration can be used to configure a user equipment to operate in a single or multiple component carrier transmission/reception mode. Therefore a user equipment can know whether a CQI request flag being set in an uplink dedicated control information (UL-DCI) should be used for single or multiple component carrier channel quality feedback request. Accordingly, in case there are multiple component carriers available for a user equipment for downlink transmission the user equipment can interpret the hopping flag as CQI control information that is indicating the component carrier(s) on which the user equipment is to report.

Figure 20:
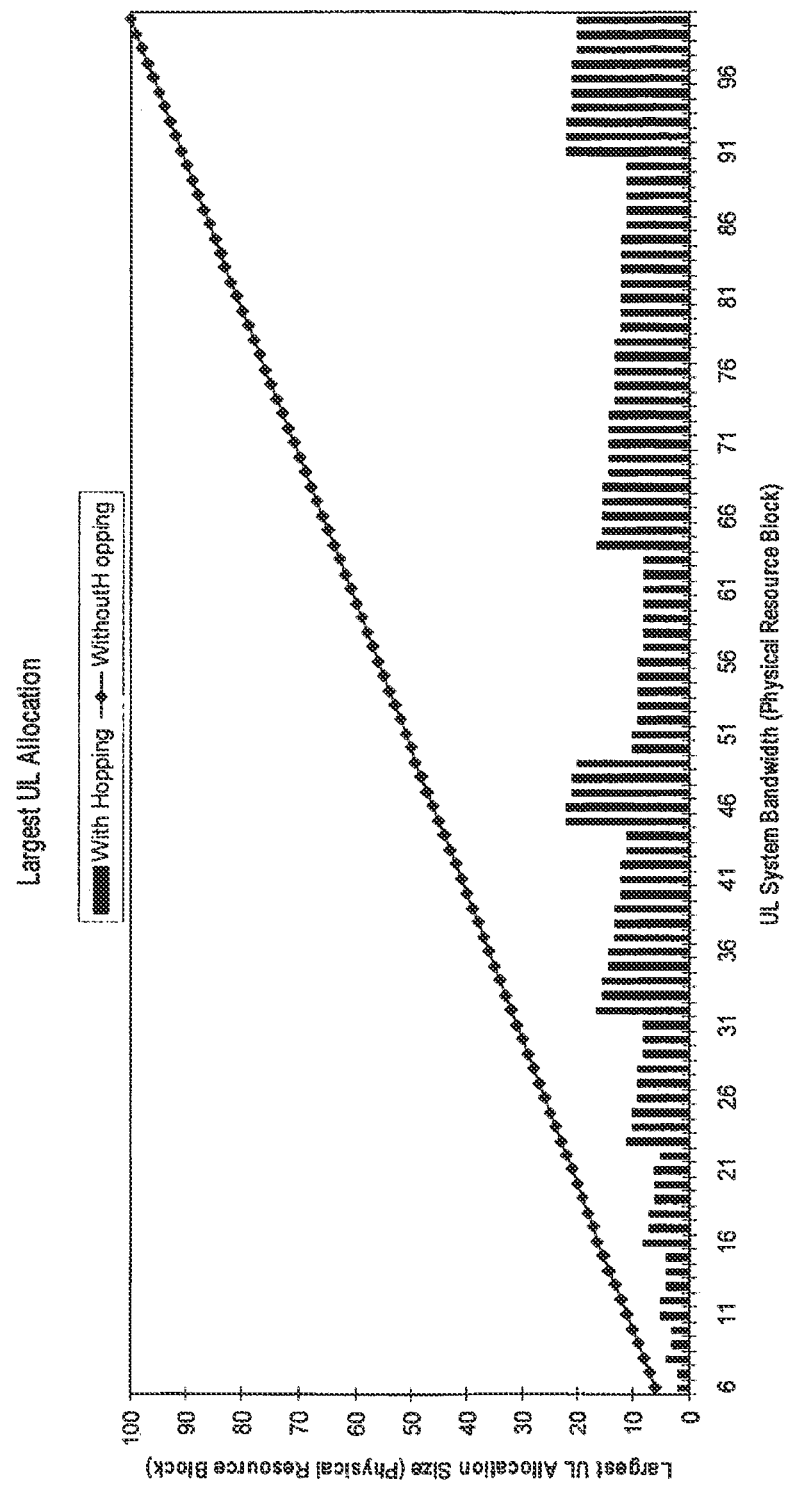
FIG. 20 shows the maximum size of allocatable physical resource blocks depending on the overall system bandwidth, when using and not using hopping in the uplink, in a 3GPP LTE (Release 8) system.

A further reason why hopping should not be applied for a slow-moving, cell-centre user equipment, or why not being able to employ hopping does not jeopardize the system operation significantly, is that for downlink as well as for uplink these user equipments can convey large packets per allocated transmission due to their generally advantageous radio channel conditions. Generally, this means that the user equipment should be able to transmit over a large portion of the available spectrum, i.e. the number of allocated resource blocks should be large. However, as can be seen in FIG. 20, the maximum resource allocation size in case hopping is activated (Hopping Flag=1—see also FIG. 7) is employed is radically smaller than without hopping. Additionally, the number of bits taken from the Resource Block Allocation field depends on the system bandwidth in terms of available resource blocks in the cell (or component carrier). FIG. 20 shows on the y-Axis, the effect on the maximum allocatable number of resource blocks and on the x-Axis the bandwidth of the system. It can be seen that only a limited fraction of the available resources can be allocated to a single user equipment in the uplink when employing hopping, which will have a negative effect on the system and cell throughput. Therefore, it is preferable that cell-centre slow-moving user equipments do not use hopping.

In a typical implementation of the LTE-A (Release 10) communication system, it can be assumed that the dedicated control channel information according to the formats (such as DCI format 0) exemplified in FIG. 4 and FIG. 19 will have at least one padding bit to match the size of the dedicated control information to that of DCI format 1A—generally to match the size of a first DCI format to the size of a second DCI format. Accordingly, if the payload for DCI format 0 is smaller than the payload for DCI format 1A (including any padding bits appended to DCI format 1A), zeros are appended to DCI format 0 until the payload size equals that of DCI format 1A. Even though the value of these padding bits is fixed, they are not defined for any particular purpose other than to adjust the payload size. Consequently, in one embodiment of the invention, the padding bit(s) within the dedicated control information are used to signal the CQI control information to indicate the component carrier(s) on which the user equipment should report. In this embodiment of the invention, the dedicated control information transmitted to the user equipment comprises the CQI request flag and at least one padding bit.

FIG. 9 shows an exemplary interpretation of the content of dedicated control information (DCI) according to DCI format 0 of 3GPP LTE (Release 8) for FDD operation (see FIG. 4), when reusing the format in 3GPP LTE-A (Release 10) system, to exemplify this embodiment of the invention. Of course this example could be likewise realized using a DCI format 0 as of FIG. 19 or on DCI format 0 for TDD operation, since it can be assumed that the fields available for FDD operation are also available for TDD operation. The user equipment that is receiving the dedicated control information according to FIG. 9 is checking whether or not the CQI request bit is set (=1) to trigger aperiodic channel quality feedback from the user equipment. Assuming that this is the case, the user equipment will interpret the padding bit(s) of the dedicated control information as the CQI control information, i.e. an indication of the downlink component carrier(s) to be reported and will send channel quality feedback for the indicated component carrier(s).

The interpretation of the padding bits as CQI control information as exemplified above may also be viewed as a new DCI format 0 for cases where the CQI request bit is set (=1). FIG. 14 exemplary shows this new dedicated control channel format. Hence, similar to the case of using the hopping flag for signaling the CQI control information as described with respect to FIG. 8 and FIG. 13 above, the CQI request flag may also be viewed as a format indicator that is indicating whether the dedicated control information has a first format (CQI request flag is not set (=0))—that is the dedicated control information is interpreted by the user equipment according to the default definition of the DCI format—or has a second format (CQI request flag is set (=1))—that is a format where the portion of the dedicated control information that is carrying padding bit(s) according to the default definition of the DCI format is carrying the CQI control information as exemplified in FIG. 14.

According to a further embodiment of the invention, the bits used to determine a cyclic shift applied to the transmission of demodulation reference symbols (DMRS) at the terminal ("Cyclic Shift DMRS bits") are used to indicate on which and how many of the available component carrier(s) a user equipment is to report channel quality feedback. Accordingly, in this exemplary embodiment of the invention the uplink dedicated control information provided to the user equipment comprises a CQI request flag and at least some Cyclic Shift DMRS bits. In one exemplary implementation, there are Cyclic Shift DMRS bits foreseen in the predetermined format of the dedicated control information.

The cyclic shift for the DMRS is typically employed in a 3GPP-based communication system to enable transmission from two different terminals using the same or at least partly overlapping time-frequency resources in the uplink. By means of a cyclic shift of the DMRS between the two transmitting terminals, it is possible for the eNodeB to distinguish/decompose the two interfering signals received from the terminals again and to decode both successfully. This is sometimes referred to as employing a multi-user MIMO uplink scheme (UL MU-MIMO).

A fundamental requirement of a multi-user MIMO uplink scheme is that the radio channels on which the two terminals send their uplink data should be statistically independent as possible, otherwise the decomposition and decoding will be suboptimal and may result in a lot of decoding errors. Looking at the case of slow-moving cell-centre terminals, it is however highly likely that the radio channels are highly correlated, particularly if looking at line-of-sight scenarios. Therefore it is unlikely that two such terminals will be assigned to transmit on the same frequency resource. Consequently, the Cyclic Shift DMRS field in the uplink dedicated control information is commonly not used for such terminals and can be re-used for indicating the component carrier(s) for which a user equipment should send channel quality feedback.

Even if the Cyclic Shift DMRS bits are reused as for example in DCI format 0 exemplified in FIG. 4 and FIG. 19, employing a multi-user MIMO uplink transmission from two (or more) terminals is still possible. The only constraint for such a scenario would be then that the two (or more) terminals which share part or all uplink time/frequency resources at the same time should not receive a CQI trigger at the same time. If this is ensured by the access network node (e.g. the eNodeB or relay node), the terminal receiving a trigger for reporting channel quality feedback would employ a predefined cyclic shift of which both sides—the network (eNodeB) and the reporting terminal—are aware (e.g. by specification or control signaling). The eNodeB or relay node can therefore determine another orthogonal cyclic shift(s) for the other terminal(s) and signal same using the Cyclic Shift DMRS field for the other terminal(s) not receiving the CQI trigger (if the CQI request flag is not set, the cyclic shift signaled in the Cyclic Shift DMRS field is applied by the terminal as usual). Therefore effectively the eNodeB or relay node can ensure that the DMRS transmitted by these terminals are mutually orthogonal, even if one of the terminals is triggered to send channel quality feedback. This method can further be extended such that multiple terminals can be triggered to send channel quality feedback, under the condition that the mentioned predefined cyclic shift for each such terminal is different, resulting in mutually orthogonal employed DMRS sequences.

Figure 11:
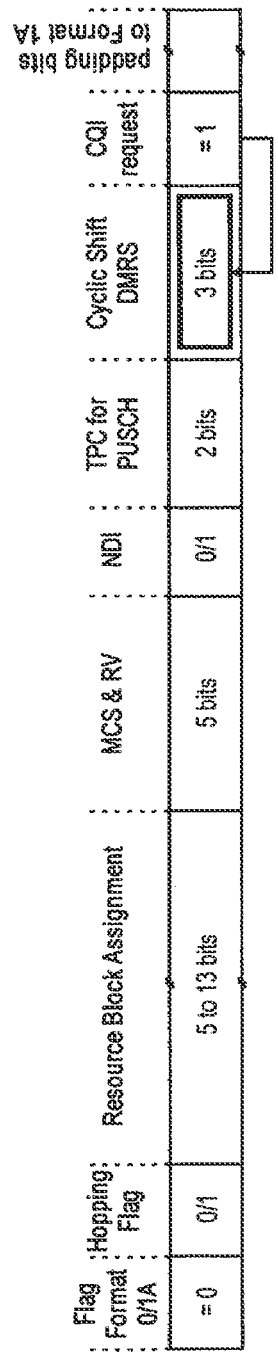
Figure 12:
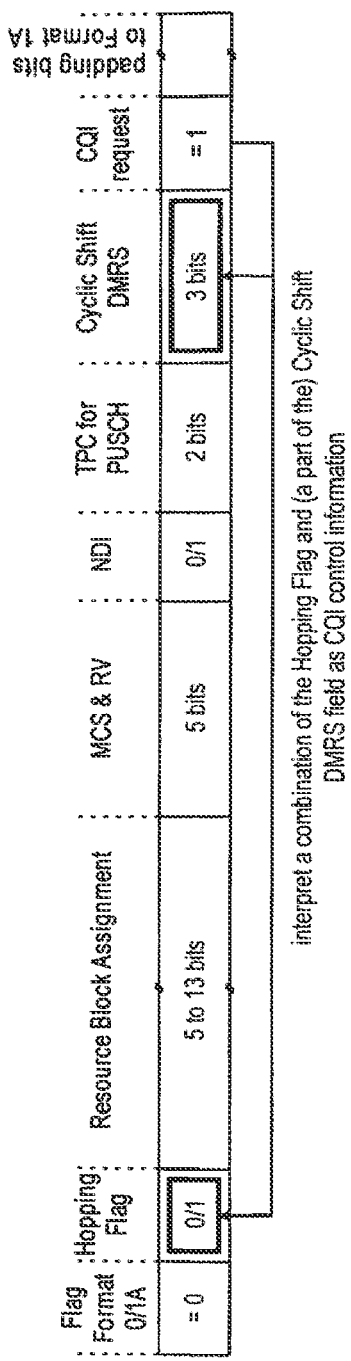

FIG. 11 shows an exemplary interpretation of the content of dedicated control information (DCI) according to DCI format 0 of 3GPP LTE (Release 8) for FDD operation (see FIG. 4), when reusing the format in 3GPP LTE-A (Release 10) system, to exemplify this embodiment of the invention. Of course this example could be likewise realized using a DCI format 0 as of FIG. 19 or on DCI format 0 for TDD operation. An eNodeB or relay node that is requiring a user equipment to send channel quality feedback on one or more component carriers available for downlink transmission to this user equipment can signal dedicated control information for an uplink transmission to the user equipment in which the CQI request flag is set. The eNodeB or relay node includes an indicator of the component carrier(s) to be reported into the Cyclic Shift DMRS field which would be commonly used to signal the cyclic shift to be applied by the user equipment for the uplink transmission. The user equipment that receives the dedicated control information recognizes the CQI request flag being set and interprets the content of the Cyclic Shift DMRS field within the dedicated control information as CQI control information indicating the component carrier(s) for which the user equipment is to provide channel quality feedback.

In case the user equipment recognizes the CQI request flag set, the user equipment may apply a cyclic shift to the DMRS that has been previously configured by higher-layer control signaling or a default cyclic shift for the uplink transmission, and transmit the channel quality feedback for the indicated component carrier(s) and optionally further uplink data.

In one further embodiment of the invention, not all of the bits of the Cyclic Shift DMRS field are used for indicating the CQI control information. For example, assuming that there are 3 bits foreseen for the Cyclic Shift DMRS field, 2 bits thereof could be used to indicate to the user equipment for which component carrier(s) available for downlink transmission to the user equipment, the user equipment should report, while the remaining 1 bit could be used to signal the application or non-application of a cyclic shift to the DMRS sequence for the uplink transmission. Hence, in case this 1 bit is set, the user equipment applies a configured or predetermined cyclic shift to the uplink transmission, while it does not do so, if this 1 bit is not set.

Again, the interpretation of the Cyclic Shift DMRS bits of the dedicated control information as CQI control information as exemplified above may also be viewed as a new DCI format 0 for cases where the CQI request bit is set (=1). FIG. 16 exemplary shows this new dedicated control channel format. Again, the CQI request flag can be viewed as a format indicator that is indicating whether the dedicated control information has a first format (CQI request flag is not set (=0))—that is the dedicated control information is interpreted by the user equipment according to the default definition of the DCI format—or has a second format (CQI request flag is set (=1))—that is a format where (a portion of) the Cyclic Shift DMRS bits in the dedicated control information is carrying the CQI control information as exemplified in FIG. 16.

In the examples that have been discussed in the preceding paragraphs, there has been a further, second control information field (in addition to the CQI request flag) that has been used to indicate the component carrier(s) for which a terminal (e.g. user equipment) is to report channel quality feedback. It should be noted that it is also possible to interpret more than one further second field as indicative of the component carrier(s) for which channel quality feedback is to be provided by the terminal.

For example, in a further embodiment of the invention, the hopping configuration bits that are foreseen to signal the hopping configuration in a conventional dedicated control information format as exemplified in FIG. 7 are used to signal the CQI control information to the user equipment in an LTE-A (Release 10) communication system. As explained before, hopping may be generally undesirable for slow-moving cell-centre user equipments, so that the 1-2 bits that indicate the hopping configuration would rarely if ever be used. However, the interpretation of the Resource Block Assignment (RBA) field in case hopping is activated (see FIG. 7) can be re-used for the case that channel quality feedback for one or more of multiple component carriers is requested, such that the 1-2 bits originally used as Hopping Configuration Bits are used as CQI control information (CQI-CI). The advantage of this solution is that the use of hopping in the uplink would still be possible, as the Hopping Flag retains its original function and meaning. The hopping configuration may be for example configured in advance by higher layer signaling (e.g. RRC signaling). The potential drawback of this solution is that the maximum allocatable uplink resource size is quite strictly limited (see FIG. 20), which may not be in the interest for the operator. Therefore, in a variant of this embodiment it may be a good trade-off to "steal" only one bit from the Resource Block Assignment field for CQI control information, so that the CQI control information space is extended by 1 bit but the limitation on the maximum allocatable uplink resource size is less severe than shown in FIG. 20.

In another exemplary embodiment, a combination of the Hopping Flag and (one bit of) the Hopping Configuration Bits are used as CQI control information. As exemplified in FIG. 10, in case the CQI request flag is set (=1) in the dedicated control information, the user equipment is interpreting a combination of the hopping flag and hopping configuration bit(s) that span into the resource block Assignment field as the CQI control information. In this example, as the Hopping Flag is also used for the CQI control information signaling, it is not possible to utilize hopping for the uplink transmission by the user equipment any longer. However, this solution may be advantageous as for example only one bit of the Hopping Configuration Bits could be used in combination with the Hopping Flag for indicating the CQI control information, so that this solution imposes fewer restrictions to the maximum allocatable uplink resource size. As further illustrated in FIG. 15, this exemplary solution may be again considered a new dedicated control information format for cases where the CQI request flag is set.

Another exemplary implementation and embodiment of the invention is the use of a combination of the Hopping flag and (at least a part of) the Cyclic Shift DMRS bits for the signaling of the component carrier(s) for which the user equipment is to provide channel quality feedback. This is exemplified in FIG. 12, where—in case the CQI request flag is set (=1)—the user equipment will combine the bit of the Hopping flag and (at least a part of) the Cyclic Shift DMRS bits and will interpret this combination as CQI control information indicating the component carrier(s) for which it should report. This way, there is up to a total number of 4 bits that is available to signal different combinations of one or more component carriers for which the user equipment is to provide channel quality feedback. Again this exemplary implementation may be considered a definition of a new format for the dedicated control information in case the CQI request flag is set. FIG. 17 is illustrating the new dedicated control information format that is corresponding to the interpretation of a combination of the Hopping flag and (at least a part of) the Cyclic Shift DMRS bits as the CQI control information as discussed above.

In one further embodiment of the invention, a combination of the Hopping flag, the padding bit(s) and (at least a part of) the Cyclic Shift DMRS bits is used for signaling the combination of one or more component carriers for which channel quality feedback is to be reported. If the CQI request flag is set in the dedicated control information, the user equipment will combine the bits of all three fields in a predetermined fashion and will interpret the resulting combined bit combination as the CQI control information that indicates the component carrier(s) for which channel quality feedback is to be reported. This exemplary embodiment would allow to use up to 5 bits (or even more, depending on the number of the padding bits) for signaling combinations of component carrier(s) for which channel quality feedback is to be reported, so that any arbitrary combination of component carriers can be indicated, assuming that there is a maximum aggregation of five component carriers for downlink transmission.

In another exemplary embodiment of the invention, there are uplink carrier indicator bits foreseen in the format of the dedicated control information in order to indicate the component carrier(s) for which the uplink dedicated control information is valid, specifically on which uplink component carrier(s) the subsequent UL transmission is to occur. An exemplary dedicated control information format comprising an uplink carrier indicator is illustrated in FIG. 19.

For multiple component carrier downlink/uplink transmission, one possibility to identify the component carrier on downlink/uplink to which the downlink/uplink dedicated control information is pertaining to is that the component carrier where the dedicated control information is transmitted determines for which component carrier in downlink/uplink the resource assignment is valid. For uplink dedicated control information (UL-DCI), this is known as the "paired DL-UL component carrier" relation. However, there may be case a UL-DCI is transmitted on a downlink component carrier but the corresponding assignment should be valid for another but not the corresponding paired uplink component carrier. The paired uplink component carrier may also be referred to as a linked uplink component carrier as it is linked to the downlink component carrier on which the UL-DCI is received according to a given relation. It may be possible that different downlink component carriers are linked to the same uplink component carrier, which may be for example advantageous when there is an asymmetric configuration of uplink and downlink component carriers, e.g. there are more downlink component carriers than uplink component carriers available.

One solution to identify the uplink component carrier to which the dedicated control information pertains is to include an uplink carrier indicator field (UCI) to the dedicated control information to determine the target uplink component carrier(s). In case channel quality feedback for one or multiple component carriers is requested, in one embodiment of the invention, the uplink carrier indicator is fully or partly used for signaling the CQI control information. This will restrict the UL-DCI to be valid for the paired uplink component carrier(s) only. Alternatively, the pairing may be alternatively configured by control signaling or be predetermined for cases where the CQI request flag is set in the dedicated control information.

Depending on how the CQI control information is included in the dedicated control information, respectively, which control information field or fields thereof are used, different numbers of bits are available for indicating on which component carrier(s) the user equipment is to report channel quality feedback. In the examples given above, the number of bits containing the CQI control information can range from 1 to 4 or even more bits. Therefore, the flexibility how the CQI control information (CQI-CI field) indicates for which downlink component carriers the user equipment should provide channel quality feedback can be quite different, depending also on the actual number of downlink component carriers that are available, it can be generally assumed that the $it^{th}$ CQI control information value denotes an $it^{th}$ combination of component carrier(s) for which channel quality feedback is requested. In the following paragraphs, different examples are discussed how to use the different possible numbers of bits available for CQI control information.

In one exemplary embodiment, the carrier indicator field (UCI) of the dedicated control information determines the target uplink component carrier(s) of the uplink resource assignment (UL-DCI) and is further indicating CQI control information, if the CQI request flag is set. As outlined above, the carrier indicator field (UCI) may for example consist of 3 bits which allows the signaling of 8 different bit combinations (values)—which are required for distinguishing the component carriers of a communication system using a maximum of five uplink component carriers.

As the carrier indicator field (UCI) still needs to indicate the uplink component carrier for which the uplink resource assignment is valid, in this exemplary embodiment, the bit combinations of the carrier indicator field (UCI) are used to implicitly or explicitly indicate the uplink component carrier to which the resource assignment pertains as well as to indicate the downlink component carrier(s) for which channel quality feedback is requested and to be provided.

The following tables show different examples how the carrier indicator field (UCI) within an UL-DCI could be interpreted, if the CQI request flag is set. The column "UCI value" indicates the different bit combinations (also referred to as values or code-points) that can be signaled in the carrier indicator field, while the other columns define the different meanings for the given bit combinations.

The column "Uplink Component Carrier Index" indicates for which component carrier in the uplink (UL) the UL-DCI is valid (i.e. on which uplink component carrier the UL-DCI is assigning resources). Unless stated otherwise, the examples below assume that there are up to five component carriers in the uplink identified by a respective index #1, where i=[1, ... , 5]. The "linked UL CoCa" is the uplink component carrier that is (commonly) linked (paired) to the downlink component carrier on which the UL-DCI is received, "semi-statically configured UL CoCa" means that the UL-DCI pertains to a component carrier that has been semi-statically configured, e.g. using RRC signaling. The semi-static configuration may be under certain circumstances be identical to the "linked UL CoCa", however it may generally be determined based on other criteria. The "semi-statically configured UL CoCa" could therefore indicate the "linked UL CoCa", i.e. includes a reference to the corresponding downlink component carrier, the "semi-statically configured UL CoCa" can also be an uplink component carrier where it is irrelevant whether or to which downlink component carrier it is linked.

As can be told from the name, the column "Downlink Component Carrier(s) to be Reported" indicates for which downlink (DL) component carrier or carriers channel quality information is requested and to be provided in the uplink. "CoCa carrying UL-DCI" means that the terminal is to report for the downlink component carrier on which the UL_DCI (with the CQI flag being set) has been received. "All available DL CoCas" means all available downlink component carriers as has been defined previously herein, while "semi-statically configured DL CoCa(s)" means that the terminal should report for one or more of the downlink component carriers according to a semi-static configuration, e.g. configured by means of RRC signaling between the terminal and the access network (e.g. eNodeB).

TABLE 1

| UCI Value (binary) | Uplink Component Carrier Index | Downlink Component Carrier(s) to be Reported |
| --- | --- | --- |
| 000 | #1 | CoCa carrying UL-DCI |
| 001 | #2 | CoCa carrying UL-DCI |
| 010 | #3 | CoCa carrying UL-DCI |
| 011 | #4 | CoCa carrying UL-DCI |
| 100 | #5 | CoCa carrying UL-DCI |
| 101 | linked UL CoCa | CoCa carrying UL-DCI |
| 110 | linked UL CoCa | all available DL CoCas |
| 111 | linked UL CoCa | semi-statically configured DL CoCa(s) |

As mentioned previously, in the physical layer of a 3GPP-based system such as 3GPP LTE or LTE-A, the dedicated control information is part of the L1/L2 control signaling that is transmitted via the PDCCH to the user equipments. The eNodeB that is signaling the L1/L2 control information in a 3GPP-based system may send several DCI messages to a single user equipment, wherein each DCI may be transmitted on different downlink component carriers.

At least in those cases where an UL-DCI does not contain a carrier indicator field (UCI) even though there are multiple uplink component carriers available, it can be assumed that a downlink component carrier is linked to a single uplink component carrier, where that link may be established by means of e.g. semi-static configuration. Consequently, the user equipment can assume that UL-DCI transmitted on a downlink component carrier is valid for the single linked uplink component carrier, just in the same way it would be valid in case no carrier indicator field was present. Where applicable, it is assumed in the following embodiments and examples that this component carrier linkage is established even though a carrier indicator field (UCI) may be present in the UL-DCI.

The values representable by the carrier indicator field may be divided in different subsets associated with respective common properties. In a first subset of values or code-points "000" to "100" is used for signaling the uplink component carrier to which the resource assignment of the UL-DCI pertains and it is so to say common to these values that channel quality feedback is to be provided by the terminal for the downlink component carrier on which the UL-DCI is received. Moreover, a second subset may be formed by the values signaling that channel quality feedback is to be provided for all downlink component carriers. In the example of this second subset thus only contains the code-point "110", however as mentioned before, only shows one possible implementation, and there may be others where more than a single code-point indicates that channel quality feedback is to be provided for all downlink component carriers.

Further, it should be noted that the UCI value "101" is redundant in the example shown in assuming that there are up to five uplink carriers available. In case there are up to five uplink component carriers available, the UCI value "101" is not required in this form, as the "linked UL CoCa" can only refer to one of uplink component carriers #1 to #5, so that effectively also one of UCI values "000" to "100" could be used for the same purpose.

Nevertheless, if there are more than five uplink component carriers available, the code-points "000" to "100" of the component carrier indicator field could be used to indicate a defined uplink component carriers index, while one code-point could identifies the linked uplink component carrier. For example, if there are six component carriers in the uplink, the implementation of would allow to individually indicating each of the uplink component carriers—UCI values "000" to "100" could be used to indicate uplink component carriers #1 to #5 respectively, while e.g. UCI value "101" could indicate uplink component carrier index #6 provided that the UL-DCI is transmitted on a DL component carrier that is linked to uplink component carrier #6.

Another exemplary implementation relates to a scenario where there are six, seven or eight uplink component carriers available. In this case, one or more of the UCI values "101", "1 10" and "1 1 1", depending on the exact number of uplink component carriers, could be used to indicate the respective component carrier(s) in a similar fashion as for UCI values "000" to "100". In an further alternative implementation, UCI values "110" and "111" could be used as discussed above with respect to (or at least one of them could be reserved for future use), while the UCI value "101" is used to implicitly identify one of uplink component carriers #6 to #8 by transmitting the UL-DCI (PDCCH) on the respective linked downlink component carrier of these uplink component carriers #6 to #8.

The embodiments, implementations and examples that have been described with respect to are particularly beneficial in case that the network wants to have a very flexible control over the uplink transmissions from the user equipments in a cell, and where there are actually many uplink allocations (i.e. transmissions) in the same subframe. In that case, the eNodeB needs to send many PDCCHs carrying UL-DCI, where not all PDCCHs may be transmitted in the desired linked component carrier. Therefore the eNodeB needs to be flexible in balancing the load between the user equipments and the uplink component carriers by being able to explicitly assign many user equipments with channel quality feedback transmission to the uplink component carriers.

In a further exemplary implementation—and again assuming for exemplary purposes up to five component carriers in the uplink—and as shown in Table 2, the UCI value "101" could also be used to indicate that the uplink assignment is valid for a component carrier that has been defined and configured semi-statically, e.g. by RRC signaling. In an exemplary embodiment, this uplink component carrier is a default or fallback component carrier that is used to convey control information such as HARQ feedback messages in the absence of an implicit or explicit uplink component carrier indication. This may further preferably be the one out of multiple uplink component carriers with the smallest path-loss, or that is configured to occupy the largest bandwidth.

TABLE 2

| UCI Value (binary) | Uplink Component Carrier Index | Downlink Component Carrier(s) to be Reported |
|---|---|---|
| 000 | #1 | CoCa carrying UL-DCI |
| 001 | #2 | CoCa carrying UL-DCI |
| 010 | #3 | CoCa carrying UL-DCI |
| 011 | #4 | CoCa carrying UL-DCI |
| 100 | #5 | CoCa carrying UL-DCI |
| 101 | semi-statically configured UL CoCa | all available DL CoCas |
| 110 | linked UL CoCa | all available DL CoCas |
| 111 | linked UL CoCa | semi-statically configured DL CoCa(s) |

Furthermore, the UCI value "111" in and Table 2 indicates channel quality feedback for one or more downlink component carriers according to a semi-static configuration. Such a semi-static configuration can preferably encompass the downlink component carriers with a path-loss below a certain threshold, or simply the component carriers that are facing the smallest path-loss(es). Alternatively, the UCI value "11 1" can further be modified to request channel quality feedback for semi-statically configured downlink component carriers and assigns uplink resources on a semi-statically configured uplink component carrier. It should be understood that both these semi-static configurations can be done independently from each other. Alternatively, the value "111" could also be reserved for future use. Similarly, for example if there are six uplink component carriers, six of the UCI values could be used to indicate the respective six uplink component carriers, while the two remaining UCI values may be reserved for future use.

It may be further beneficial to be able to indicate with the component indicator field (UCI) that channel quality feedback for all downlink component carriers ("all available DL CoCas") should be transmitted in a single uplink component carrier without any higher layer data. In the context of LTE Release 8 and Release 10, higher layer data would be for example any data belonging to a MAC PDU which is transmitted on UL-SCH (see 3GPP TS 36.321, "Medium Access Control (MAC) protocol specification", version 8.5.0. section 5.4 and its subsections, available at http://www.3gpp.org and incorporated herein by reference). In that respect, "without any higher layer data" would mean that no MAC PDU data is transmitted (multiplexed) with the channel quality feedback, or equivalently that there is no associated UL-SCH available in the assigned uplink resource. It may be further noted that a MAC PDU is usually associated with a transport block on the physical layer. On the other hand, it may still be desired that lower layer control channels or signals such as HARQ feedback (ACK/NACK) still multiplexed with the channel quality feedback, i.e. in this case the UL-DCI would allow for sending the channel quality feedback, but no higher layer data except for control signaling, e.g. HARQ feedback. In another embodiment, at least one entry of the component indicator field indicates that neither higher layer nor lower layer channels or signals are transmitted by the user equipment together with the channel quality feedback, with the exception of signals that are required to successfully receive the uplink transmission such as reference symbols.

Hence, in another exemplary implementation, the codepoints could be defined as in or Table 2, but the code-point "101" or "111" indicates the UL-DCI to be valid for the "linked UL CoCa" and requests sending only channel quality feedback (e.g. CQI) on the allocated resources (i.e. particularly no higher layer data, even though other control signals such as HARQ feedback (ACK/NACK) may still be included in the transmission on the allocated resources together with the channel quality feedback).

The examples that have been described with respect to Table 2 provide basically the same advantageous as the exemplary implementations that have been described in connection with.

However, since it is possible to address and request for semi-statically configured uplink and downlink component carriers respectively, the exemplary implementations that have been outlined with respect to Table 2 are also applicable in case there is a preferred uplink or downlink component carrier available in a system. For example, one or more "special" uplink component carrier(s) could be defined where all control messages for uplink are conveyed, unless explicitly requested otherwise. This "special" uplink component carrier may be chosen because it has generally favorable transmission characteristics for a user equipment. According to another embodiment of the invention, the network (eNodeB) can request the channel quality feedback to be transmitted on that special uplink component carrier. Likewise, one or more "special" downlink component carrier(s) could be identified, where e.g. channel conditions are generally favorable, where the major part of downlink control and/or data transmission happens. In this case, the network (eNodeB) may request channel quality feedback for those "special" downlink component carriers in order to allow an optimum scheduling or link adaptation decision. In these cases, the "special" component carrier(s) should constitute the "semi-statically configured" uplink and downlink component carrier(s), respectively, as outlined previously.

In addition, it should be noted that the possibility to explicitly request a channel quality feedback message without higher layer data or channels is an efficient way to save uplink resources for channel quality feedback, or to establish more control over the quality of the channel quality feedback transmission, since then the assigned forward error correction coding needs to be optimized just for the channel quality feedback, without need to care of implications to the error correction coding performance for the higher layer data or channels. It should be also noted that in this context, unless explicitly stated otherwise, it is possible to transmit the channel quality feedback together with higher layer or other lower layer data or channels on the assigned uplink resources.

As can be seen from various figures, e.g. FIG. 4 or FIG. 19, the dedicated control information format may have a varying size depending on the length of the Resource Block Assignment (RBA) field—this is because the size of the RBA field may depend on the respective component carrier's bandwidth. For example, in 3GPP LTE (Release 8) the DCI Format 0 for a single antenna transmission on a component carrier with 20 MHz bandwidth has a size of 30 bits. The DCI size for a transmission to use spatial multiplexing in a 5 MHz component carrier and PMI of 4 bits could be also 30 bits. Hence, also in cases where the uplink component carriers have different bandwidth, it should be known to the terminal for which component carrier the dedicated control information is valid, e.g. by means of a carrier indicator field as discussed previously herein.

As can be anticipated, the interpretation of the carrier indicator field (UCI) in cases where the CQI request flag is not set can be assumed to be defined as shown in Table 1 for UCI values "000" to "100". However, there may be cases that UCI values would be interpreted in a different fashion in case the CQI request flag is set, as shown e.g. in Table 3. Since the interpretation of the carrier indicator field therefore possibly depends on whether CQI request flag in the DCI is set or not, it is advantageous if the CQI request field is located at a fixed (i.e. known, independent of the format or bandwidth of the component carrier on or for which it is transmitted) position within the DCI. For example, FIG. 22 shows an exemplary format for dedicated control information according to an embodiment of the invention that is similar to that shown in FIG. 19 regarding the contained information. However, in contrast to FIG. 19, the carrier indicator field (CIF)—that is the UCI field of FIG. 19—is located at the beginning of the DCI information in this exemplary format. Generally, it should be noted that the "fixed position" is not necessarily the beginning of the DCI, but a position that irrespective of the usage or size of other fields. In a specific example, such a position is before the first variable length field of the DCI or in a block which has identical fields independent of the DCI format (e.g. before the RBA field). In another specific example, such a position is close to the end such that the same criterion can be met if checking the contents of the DCI information from end to beginning, as it were. In this context, in a further embodiment of the invention, also the CQI request flag may be located at a fixed position as shown in FIG. 23, illustrating a further exemplary format for dedicated control information according to an embodiment of the invention.

In the examples discussed above with respect to and Table 2, the carrier indicator field (UCI) has been interpreted so as to still (explicitly) indicate the uplink component carrier (index) on which the UL-DCI grants resources, while the downlink component carrier(s) to be reported for have been either identified as the component carrier carrying the UL-DCI, all component carriers, or according to semi-static configuration. In the example shown in Table 3 below, the uplink component carrier (index) is interpreted such that there is more flexibility in indicating the downlink component carrier(s) to be reported for, trading off the flexibility in the identification of the uplink component carrier to which the UL-DCI pertains.

TABLE 3

| UCI Value (binary) | Uplink Component Carrier Index | Downlink Component Carrier(s) to be Reported |
|---|---|---|
| 000 | linked UL CoCa | #1 |
| 001 | linked UL CoCa | #2 |
| 010 | linked UL CoCa | #3 |
| 011 | linked UL CoCa | #4 |
| 100 | linked UL CoCa | #5 |
| 101 | linked UL CoCa | CoCa carrying UL-DCI |
| 110 | linked UL CoCa | all available DL CoCas |
| 111 | linked UL CoCa | all available DL CoCas (no UL higher layer data) |

In Table 3 the carrier indicator field is essentially no longer explicitly indicating the uplink component carrier, but the terminal assumes that the UL-DCI refers to the linked uplink component carrier of the downlink component carrier on which the UL-DCI is received, if the CQI request flag is set in the UL-DCI. Using values "000" to "100" the individual downlink component carriers can be indicated (assuming again no more than five downlink component carriers in the system). The value "101" may be thus redundant again as explained above for and may be used otherwise (reserved, different meaning as explained above, or applicable for cases where there are more than five downlink component carriers). The code-point "110" triggers the transmission of channel quality feedback for all available downlink component carriers, where the assigned uplink resources on the linked uplink component carrier can be used by the terminal for transmitting channel quality feedback and uplink higher layer data (such as MAC PDU(s)) simultaneously. The code-point "111" triggers the transmission of channel quality feedback for all available downlink component carriers, where the uplink grant on the linked uplink component carrier is to be used for signaling channel quality feedback only (no UL higher layer data).

Please note that in the example of Table 3, one could also view this solution as the CQI request flag indicating that the UL-DCI is pertaining to the linked uplink component carrier (the respective column in Table 3 yields the same meaning for all code-points in this example) so that the carrier indicator field essentially (only) defines the downlink component carriers for which channel quality feedback is to be provided.

The embodiments, implementations and examples that have been described with respect to Table 3 are particularly beneficial in case that the network wants to have a maximum control over the kind of channel quality feedback, i.e. just for a single downlink component carrier, for all available downlink component carriers including higher layer data, or for all available downlink component carriers without higher layer data. This is for example beneficial in scenarios where there are many user equipments in a cell where there is a lot of downlink traffic but not so much uplink traffic, as can be expected for example in case that the main application is HTTP internet browsing or transferring files through the network to the user equipment.

In a further example, it is assumed that there are only four uplink and downlink component carriers available to the terminal. Accordingly, again using a carrier indicator field (UCI) of three bits, this allows for signaling two subsets of values as shown in Table 4.

TABLE 4

| UCI Value (binary) | Uplink Component Carrier Index | Downlink Component Carrier(s) to be Reported |
|---|---|---|
| 000 | #1 | #1 |
| 001 | #2 | #2 |
| 010 | #3 | #3 |
| 011 | #4 | #4 |
| 100 | #1 | all available DL CoCas |
| 101 | #2 | all available DL CoCas |
| 110 | #3 | all available DL CoCas |
| 111 | #4 | all available DL CoCas |

In the example of Table 4 again two subsets of code-points are provided. The first subset is indicating a single uplink component carrier to which the UL-DCI pertains, and further a single downlink component carrier for which channel quality feedback is to be provided. Please note that the same index numbers being used for the uplink and downlink component carriers for the respective code-points of the first subset is only exemplarily—for the example shown in Table 4 it is only important that each component carrier in uplink and downlink is indicated once by the respective four code-points of the first subset. More specifically, it should be understood that downlink component carrier #n is not necessarily linked to an uplink component carrier #n, i.e. having the same index, but the index numbers are just for exemplary purposes herein to distinguish the component carriers in uplink and downlink, respectively. The remaining code-points "100" to "111" can be considered to form a second subset of code-points, which have in common that they indicate that the terminal is to provide channel quality feedback for all available downlink component carriers (i.e. available for downlink transmission to the terminal at the time of receiving the dedicated control information).

In another example, it is assumed that there are only three uplink component carriers available for uplink transmission to the user equipment. In this case, the carrier indicator field (UCI) code-points could have a meaning as exemplified in Table 5 below.

TABLE 5

| UCI Value (binary) | Uplink Component Carrier Index | Downlink Component Carrier(s) to be Reported |
|---|---|---|
| 000 | #1 | #1 |
| 001 | #2 | #2 |
| 010 | #3 | #3 |
| 011 | #1 | all available DL CoCas |
| 100 | #2 | all available DL CoCas |
| 101 | #3 | all available DL CoCas |
| 110 | linked UL CoCa | all available DL CoCas |
| 111 | linked UL CoCa | all available DL CoCas (no UL higher layer data) |

This example is—in part—similar to Table 4, as the first subset of values ("000", "001", "010") indicates a single uplink component carrier to which the UL-DCI pertains, and further a single downlink component carrier for which channel quality feedback is to be provided, while the second subset of values ("011", "100", "101") indicates that the terminal is to provide channel quality feedback for all available downlink component carriers. The code-point "110" triggers the transmission of channel quality feedback for all available downlink component carriers, while the uplink assignment on the linked uplink component carrier can be used by the terminal for signaling channel quality feedback and uplink higher layer data simultaneously. The code-point "111" triggers the transmission of channel quality feedback for all available downlink component carriers, while the uplink assignment on the linked uplink component carrier is to be used for signaling channel quality feedback only (no UL higher layer data). Again it should be noted that in one exemplary embodiment, HARQ feedback, e.g. ACK/NACK, may be signaled together with the channel quality information, even in cases where no (other) uplink higher layer or lower layer data or channels should be transmitted.

In another further example, it is assumed that there are only two uplink component carriers and two downlink component carriers available to the user equipment. As can be seen from Table 6, the values representable by the 3 bit of the carrier indicator field are split up into four subsets. Again, identical numbering for uplink and downlink component carriers should not be read as restricting that carriers of the same index in uplink and downlink are required to be linked to each other. The first subset is formed by values "000" and "001", and triggers channel quality feedback for the first downlink component carrier, while the UL-DCI pertains to either the first or second uplink component carrier, respectively. The second subset of values is formed by values "010" and "011", and triggers channel quality feedback for the second downlink component carrier, while the UL-DCI pertains to either the first or second uplink component carrier, respectively.

The third subset is formed by values "100" and "101", and triggers channel quality feedback for all available component carriers in the downlink (e.g. the first and second downlink component carrier), while the UL-DCI pertains to either the first or second uplink component carrier, respectively. The fourth subset is formed by values "110" and "111", and triggers channel quality feedback for all available component carriers in the downlink (e.g. the first and second downlink component carrier), while the UL-DCI pertains to either the first or second uplink component carrier, respectively and only the channel quality feedback for both downlink component carriers should be sent on the allocated uplink resources. It should be obvious that this example can be applied to any case where there are two uplink component carriers and an arbitrary number of downlink component carriers.

It can be observed that in the example of Table 6, the last bit of the code-points determines the uplink component carrier to which the UL-DCI refers to, which may beneficially exploited in an implementation.

TABLE 6

| UCI Value (binary) | Uplink Component Carrier Index | Downlink Component Carrier(s) to be Reported |
| --- | --- | --- |
| 000 | #1 | #1 |
| 001 | #2 | #1 |
| 010 | #1 | #2 |
| 011 | #2 | #2 |
| 100 | #1 | all available DL CoCas (usually #1 + #2) |
| 101 | #2 | all available DL CoCas (usually #1 + #2) |
| 110 | #1 | all available DL CoCas (no UL higher layer data) |
| 111 | #2 | all available DL CoCas (no UL higher layer data) |

In another example, it is assumed that there are only two uplink component carriers available to the user equipment, but the number of available downlink component carriers is arbitrary (i.e. one or more). In this case, the carrier indicator field (UCI) code-points could have a meaning as exemplified in Table 7 below.

TABLE 7

| UCI Value (binary) | Uplink Component Carrier Index | Downlink Component Carrier(s) to be Reported |
| --- | --- | --- |
| 000 | #1 | CoCa carrying UL-DCI |
| 001 | #2 | CoCa carrying UL-DCI |
| 010 | #1 | all available DL CoCas linked to uplink CoCa #1 |
| 011 | #2 | all available DL CoCas linked to uplink CoCa #2 |
| 100 | #1 | all available DL CoCas |
| 101 | #2 | all available DL CoCas |
| 110 | #1 | all available DL CoCas (no UL higher layer data) |
| 111 | #2 | all available DL CoCas (no UL higher layer data) |

In this example, it is further envisioned that UCI values "010" and "011" request channel quality feedback reports for all available downlink component carriers that are linked to uplink component carriers #1 and #2 respectively. As outlined before, it is assumed that a single downlink component carrier is linked to just a single uplink component carrier; however a single uplink component carrier may be linked to several downlink component carriers, particularly in asymmetric downlink-to-uplink component carrier scenarios where each downlink component carrier is required to be linked to an uplink component carrier. Reporting channel quality feedback for the linked downlink component carriers may help the network to decide, if and which component carriers should be disabled for a given user equipment. For example, in case that all downlink component carriers that link to the same uplink component carrier can be disabled (e.g. because they report low quality CQI), it would subsequently also be possible to disable that linked uplink component carrier since no related control signals (such as HARQ feedback) are required to be transmitted thereon.

Furthermore, it should be noted that in the example discussed above, it has been assumed that the carrier indicator field (UCI) is comprised in each UL-DCI. However, in another embodiment of the invention, the eNode B may decide for each UL-DCI transmitted to a user equipment, whether the UL-DCI is including a carrier indicator field (UCI)— see FIG. 19, FIG. 22, or FIG. 23—or not—see FIG. 4 or FIG. 7. In this embodiment, if a UL-DCI does not contain an carrier indicator field $(UCI)_1$ the terminal assumes that the UL-DCI relates to the linked uplink component carrier and that CQI control information are included in the UL-DCI (if the CQI request flag is set) as described with respect to FIG. 8 to FIG. 17 herein. If the carrier indicator field (UCI) is included in the UL-DCI, the terminal will interpret the carrier indicator field (UCI) as discussed with respect to Table 6 herein.

In the following sections there further exemplary implementations for implementing the signaling of CQI control information depending on the number of bits available for the CQI control information are provided. Please note that these examples may also be employed when using (a part of) the carrier indicator field for signaling the CQI control information.

CQI-CI Field: 1 Bit

In case of only 1 bit is available for the CQI control information (see for example FIG. 8 or FIG. 9), according to one exemplary embodiment of the invention, this bit is used to switch between two possible states: Requesting channel quality feedback for a first combination of component carrier(s), or for a second combination of component carrier(s). The two combinations of component carrier(s) to be reported may be for example predefined (e.g. determined by the user equipment based on a predetermined rule or procedure) or could be configured by higher-layer control signaling (e.g. RRC signaling). In one exemplary implementation, the first combination corresponds to only the single downlink component carrier where the UL-DCI carrying the set CQI request flag is transmitted, and the second combination corresponds to all available downlink component carriers.

This exemplary implementation is summarized in the Table 8 below:

TABLE 8

| CQI-CI Value | Requested channel quality feedback |
|---|---|
| 0 | channel quality feedback for component carrier #n |
| 1 | channel quality feedback for all available component carriers |

In one exemplary implementation, component carrier #n would be identified with the component carrier number that carries the UL-DCI carrying the set CQI request flag.

CQI-CI Field: 2 Bits

In cases where there are 2 bits available to signal the CQI control information (e.g. when using a combination of Hopping flag and one Hopping Configuration bit), this could be seen as an extension to the one-bit case discussed above, where an additional third and fourth combination of downlink component carrier(s) can be indicated. Assuming that the downlink component carrier where the requesting UL-DCI is transmitted can be identified by index #n, in one exemplary embodiment of the invention, the third combination of component carrier(s) corresponds to the downlink component carrier with index #n+m, and the fourth combination of component carrier(s) corresponds to the downlink component carrier with index #n+k.

This exemplary implementation is summarized in the Table 9 below:

TABLE 9

| $I^{th}$ combination of component carrier(s) | CQI-CI Value (binary) | Requested channel quality feedback |
|---|---|---|
| 1 | 00 | channel quality feedback for component carrier #n |
| 3 | 01 | channel quality feedback for component carrier #n+m |
| 4 | 10 | channel quality feedback for component carrier #n+k |
| 2 | 11 | channel quality feedback for all available component carriers |

The integer numbers k and m can be generally any integer number.

Advantageously, k should not be equal to m, and k and m are both non-zero, for improved efficiency. It may be further preferable to set k=+1 and m=−1, which can be beneficially employed to "probe" the channel quality for component carriers adjacent to component carrier #n.

In another alternative and exemplary embodiment of the invention, the third combination of component carrier(s) corresponds to downlink component carrier #n and #n+m, while the fourth combination of component carrier(s) corresponds to #n and #n+k (see Table 10).

TABLE 10

| $I^{th}$ combination of component carrier(s) | CQI-CI Value (binary) | Requested channel quality feedback |
|---|---|---|
| 1 | 00 | channel quality feedback for component carrier #n |
| 3 | 01 | channel quality feedback for component carriers #n and #n+m |
| 4 | 10 | channel quality feedback for component carriers #n and #n+k |
| 2 | 11 | channel quality feedback for all available component carriers |

Again, k and m can be generally any integer number.

Advantageously, k should not be equal to m, and k and m are both non-zero, for improved efficiency.

In a further alternative and exemplary embodiment of the invention, the third combination of component carrier(s) corresponds to downlink component carrier #n to #n+m, while the fourth combination of component carrier(s) corresponds to #n to #n+k. The number m may be for example a positive integer and the number k may be a negative integer (see Table 11).

TABLE 11

| $I^{th}$ combination of component carrier(s) | CQI-CI Value (binary) | Requested channel quality feedback |
|---|---|---|
| 1 | 00 | channel quality feedback for component carrier #n |
| 3 | 01 | channel quality feedback for component carriers #n to #n+m |
| 4 | 10 | channel quality feedback for component carrier #n to #n+k |
| 2 | 11 | channel quality feedback for all available component carriers |

In a further extension to this embodiment, in case that #n+k or #n+m overflows or underflows the available component carrier indices, a "cyclic wrap-around" is employed as for example given by the modulo function to generate only numbers within the available index range.

In all the embodiments discussed above where there are 2 bits available for signaling the combination of component carrier(s) channel quality feedback for which is to be reported, it may further be beneficial to set k=−m to achieve a kind of symmetric behavior.

CQI-CI Field: 3 Bits

In cases where there are 3 bits available to signal the CQI control information (e.g. when using the cyclic shift DMRS field), this could be seen as an extension to the two-bit case discussed above, where an additional fifth to eighth combination of downlink component carrier(s) can be indicated. The exemplary embodiments for the two-bit case can be extended to the three-bit case mutatis mutandis, e.g. to request channel quality feedback for component carrier(s) #n, #n+m1, #n+m2, #n+m3, #n+k1, #n+k2, #n+k3, or for all available component carriers, respectively. The same holds to extend requesting channel quality feedback for multiple component carriers or ranges of component carriers mutatis mutandis. This exemplary implementation is summarized in the Table 12 below:

TABLE 12

| $I^{th}$ combination of component carrier(s) | CQI-CI Value (binary) | Requested channel quality feedback |
|---|---|---|
| 1 | 000 | channel quality feedback for component carrier #n |
| 3 | 001 | channel quality feedback for component carrier #n+m1 |
| 4 | 010 | channel quality feedback for component carrier #n+m2 |
| 5 | 011 | channel quality feedback for component carrier #n+m3 |
| 6 | 100 | channel quality feedback for component carrier #n+k1 |
| 7 | 101 | channel quality feedback for component carrier #n+k2 |
| 8 | 110 | channel quality feedback for component carrier #n+k3 |
| 2 | 111 | channel quality feedback for all available component carriers |

Another exemplary implementation would be to extend the implementation exemplified above with respect to Table 10 to the 3-bit case:

TABLE 13

| $I^{th}$ combination of component carrier(s) | CQI-CI Value (binary) | Requested channel quality feedback |
|---|---|---|
| 1 | 000 | channel quality feedback for component carrier #n |
| 3 | 001 | channel quality feedback for component carriers #n to #n+m1 |
| 4 | 010 | channel quality feedback for component carriers #n to #n+m2 |
| 5 | 011 | channel quality feedback for component carriers #n to #n+m3 |
| 6 | 100 | channel quality feedback for component carriers in to #n+k1 |
| 7 | 101 | channel quality feedback for component carriers #n to #n+k2 |
| 8 | 110 | channel quality feedback for comportent carriers #n to #n+k3 |
| 2 | 111 | channel quality feedback for all available component carriers |

CQI-CI Field: 4 Bits when 5 Downlink Component Carriers are Available

In case there are 4 bits available, it is possible to address 16 combinations of component carriers. Assuming that there are 5 downlink component carriers configured (numbered 0 to 4) and usable by a user equipment, there is a total number of 32 possible combinations of available component carriers. Hence, using 4 bits, not all 32 possible combinations of component carriers can be signaled. It can be assumed that it is more interesting to represent the cases of requesting channel quality feedback for few component carriers than for many component carriers, because then it is more applicable to user equipments that are operating in the grey zone between cell-centre and cell-edge, where it would be interesting to probe the channel quality for one or two component carriers to check where the radio conditions are generally favorable. Therefore, according to one embodiment of the invention, one of the following two correspondences of CQI-CI value and combinations of component carrier(s) is suggested:

TABLE 14

| CQI-CI Value (decimal) | Correspondence 1: Requested channel quality feedback for component carrier index # (0-4) | Correspondence 2: Requested channel quality feedback for component carrier index # (0-4) |
|---|---|---|
| 0 | 0 | 0 |
| 1 | 1 | 1 |
| 2 | 2 | 2 |
| 3 | 3 | 3 |
| 4 | 4 | 4 |
| 5 | 0, 1 | 0, 1, 2 |
| 6 | 0, 2 | 0, 1, 3 |
| 7 | 0, 3 | 0, 1, 4 |
| 8 | 0, 4 | 0, 2, 3 |
| 9 | 1, 2 | 0, 2, 4 |
| 10 | 1, 3 | 0, 3, 4 |
| 11 | 1, 4 | 1, 2, 3 |
| 12 | 2, 3 | 1, 2, 4 |
| 13 | 2, 4 | 1, 3, 4 |
| 14 | 3, 4 | 2, 3, 4 |
| 15 | 0, 1, 2, 3, 4 | 0, 1, 2, 3, 4 |

Inclusion of Component Carrier Containing the UL-DCI/CQI Request in the examples on how to establish a correspondence between the logical value signaled in the CQI control information in Table 8 to Table 14, it has been assumed that the indication of the component carrier(s) on which the user equipment is to provide channel quality feedback is indicated by the bits of the dedicated control information interpreted as CQI control information. For the examples in Table 9 to Table 11, the index #n of the component carrier on which the dedicated control information (UL-DCI) is received is considered in the determination of the combination of combination carrier(s) on which is to be reported in that it is the reference index for determining the component carrier(s) to report for the first, third and fourth combination.

In one further embodiment of the invention, the component carrier on which the dedicated control information (UL-DCI) including a request for channel quality feedback (CQI request flag is set) is always to be reported for. In one exemplary variant of this embodiment, the network configures whether to include the channel quality experienced by the user equipment on the component carrier on which a dedicated control information (UL-DCI) including a request for channel quality feedback (CQI request flag is set) is received, to the channel quality feedback in addition to that of another or other component carriers. For example, the eNodeB or relay node may use control signaling (such as RRC signaling) to configure the user equipment to include or not include by default a measure of the channel quality of the downlink component carrier on which the a dedicated control information (UL-DCI) including a request for channel quality feedback (CQI request flag is set) is received to the channel quality feedback. In such a way, there is one component carrier less for which CQI control information is required.

With this strategy, the correspondences of Table 10 and Table 11 for scenarios where there are 2 bits available for the CQI control information can be considered as an alternative embodiment also making use of the component carrier on which the dedicated control information is received. If the component carrier on which a dedicated control information (UL-DCI) including a request for channel quality feedback (CQI request flag is set) is received, and is further configured to be always included as a requested component carrier, then component carrier #n can be identified with any of the other available component carriers. For scenarios, where there are more than 2 bits available for signaling the CQI control information, this exemplary implementation can be particularly advantageous. For example, employing this implementation in a scenario where 4 bits are available for the CQI control information (CQI-CI) and where there are 5 component carriers available, the default inclusion of the component carrier on which the UL-DCI triggering channel quality feedback is received to the channel quality feedback effectively reduces the number of component carriers that have to be addressed by the CQI control information from five to four. Hence, the 4 bits of CQI control information (CQI-CI) can now address the full range of combinations of four component carriers in the finest possible granularity. For example, in one implementation a CQI-CI value of 0 could indicate that channel quality feedback for only the component carrier conveying the corresponding UL-DCI is requested, while a CQI-CI value of 15 could indicate a CQI request for all available (i.e. five) component carriers.

In most of the embodiments discussed in further detail so far, the CQI request bit has been a trigger for determining how to interpret other control information field(s) contained in the dedicated control information. In an alternative embodiment of the invention, the CQI control information also includes the CQI request flag so that the CQI request flag essentially loses its original meaning of triggering a channel quality feedback report from the user equipment. For example in one exemplary implementation of this embodiment, the CQI request flag can be combined with the e.g. Hopping flag and the combination of the two flags is the CQI control information. Essentially, the combination of the CQI request flag and the Hopping flag would result into two bits that can be used to configure the channel quality feedback from the user equipment. An exemplary interpretation of the two flags could look like as Table 15.

TABLE 15

CQI control information (CQI-CI)

| CQI request bit | Hopping Flag | Interpretation |
|---|---|---|
| 0 | 0 | No CQI request |
| 0 | 1 | channel quality feedback request for all component carriers |
| 1 | 0 | channel quality feedback for the component carrier carrying this UL-DCI |
| 1 | 1 | channel quality feedback for a single configured component carrier |

When interpreting certain fields of the dedicated control information in a different fashion as defined original format, some functionality may be "lost". For example, when using the Hopping Flag for signaling the CQI control information, this effectively means that the dedicated control information cannot be longer used for activating/deactivating hopping in the uplink. Similar, considering the example, where the Hopping Configuration Bits are used for the CQI control information, hopping may be still activated/deactivated by means of the Hopping flag; however, there is no longer the possibility to configure the hopping configuration in the dedicated control information. A similar observation can also be made for using the Cyclic Shift DMRS field for signaling the CQI control information. In all these examples where certain information can no longer be signed in the dedicated control information, according to one further embodiment, the "lost" functionality may be maintained by using dynamic to higher layer/semi-static signaling.

For example, as already indicated previously, the hopping configuration could be for example signaled by RRC signaling. Similarly, a default cyclic shift to be applied to the uplink transmission could also be configured by RRC signaling or semi-static configuration, so that the user equipment would use this default cyclic shift for uplink transmission, if the Cyclic Shift DMRS field is reused for signaling the CQI control information.

Furthermore, in most of the examples above, the component carrier(s) on which the terminal is to provide channel quality feedback has been (at least to some extent) explicitly indicated by the CQI control information. In a further exemplary embodiment of the invention, the component carrier(s) on which the terminal is to provide channel quality feedback may also be signaled implicitly or by combining explicit and implicit signaling. For example, Table 10 and Table 11 above show an example, where implicit (downlink component carrier used for the UL-DCI defines the index #n) and explicit (the two bits of the UL-DCI containing the CQI control information indicates one of the four options shown in the tables) signaling. Similarly, in the example where the component carrier on which the dedicated control information (UL-DCI) including a request for channel quality feedback (CQI request flag is set) is always to be reported on can be also considered using a combination of implicit and explicit signaling for indicating for which component carrier(s) the terminal is to provide channel quality feedback.

In general, it can be assumed that the UL-DCI, or the corresponding PDCCH, is transmitted to a receiver using one of multiple time/frequency resource combinations. For example, in LTE (Release 8), there is a choice by the eNodeB on what resources and with which parameters any dedicated control information (DCI) is transmitted. This encompasses such parameters as the modulation scheme, coding rate, aggregation level, and the mapping onto time/frequency resources corresponding to a common or user equipment-specific search space. Details of these characteristics can be found e.g. in St. Sesia, I. Toufik, M. Backer, "LTE The UMTS Long Term Evolution", Wiley and Sons Ltd., 2009 (ISBN: 978-0-470-69716-0), sections 9.3.2.2, 9.3.2.3, 9.3.3.2, 9.3.4, incorporated herein by reference.

Consequently, it is further possible to link the requested component carrier CQI not only to the CQI-CI as mentioned above, but also to the format or location of the corresponding UL-DCI. For example, a UL-DCI which is transmitted with a modulation and coding scheme (MCS) offering a high spectral efficiency (e.g. above a certain threshold) is most applicable for cell-centre user equipments. Therefore, in one further embodiment of the invention a CQI trigger (in form of a CQI request flag being set) in UL-DCI employing a highly-efficient MCS (e.g. above a certain threshold value) for the transmission of UL-DCI transmission triggers a channel quality feedback for all available component carriers. Conversely, a CQI trigger using a poorly-efficient modulation and coding scheme (e.g. below or equal to the certain threshold value) for the transmission of the UL-DCI triggers channel quality feedback from the terminal for a single component carrier. This single component carrier is for example the component carrier conveying that UL-DCI message or a pre-configured set of component carriers. Alternatively, the desired channel quality feedback content could also be signaled by means of the code rate or modulation scheme of the modulation and coding scheme instead of modulation and coding scheme.

Please note that in this exemplary embodiment, no further control information fields in the UL-DCI need to be interpreted in fashion different of their default meaning. It is however also possible to use this alternative implementation of indicating the desired content of the channel quality feedback by a certain modulation and coding scheme in combination with the other solutions that are discussed herein, so that more conditions can generate more flexibility. For example, a code rate criterion as mentioned above can be combined with the Hopping flag to form the CQI control information, resulting in a total of four combinations that can be used along the lines of the examples outlined above.

Furthermore, it is to be noted that not only the modulation and coding scheme or the code rate or modulation scheme thereof, but also transmission parameters like the PDCCH transmit power, mapping pattern to physical resource elements, transmission on certain resource blocks or transmission on certain component carriers, or combinations of these with the other methods applied to the UL-DCI message can be employed to deliver information to expand the flexibility of the requested channel quality feedback (i.e. the indication of different (combinations of) available component carriers for which channel quality feedback should be provided). Furthermore, different RNTIs for masking the CRC sequence (see e.g. Sesia et al., section 9.3.2.3 "CRC attachment") for a UL-DCI can be employed, such that e.g. the choice of a first RNTI indicates that channel quality feedback is triggered for one component carrier (e.g. the one on which the UL-DCI is received by the user equipment) and the choice on a second RNTI indicates channel quality feedback is triggered for all component carriers.

Figure 21:
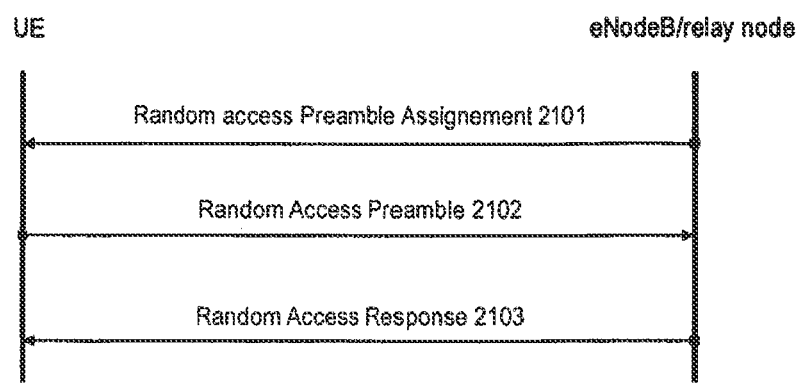
FIG. 21 shows the signaling messages of a contention free random access procedure in a 3GPP LTE (Release 8) system

The concepts outlined above are also applicable for random access of terminals the access network. FIG. 21 is illustrating the contention-free random access procedure of LTE (see also 3GPP TS 36.213, version 8.7.0, section 6.2 incorporated herein by reference). The eNodeB provides 2101 the user equipment with the preamble to use for random access so that there is no risk of collisions, i.e. multiple user equipment transmitting the same preamble. Accordingly, the user equipment is sending 2102 the preamble which was signaled by eNodeB in the uplink on a PRACH resource. After eNodeB has detected a RACH preamble, it sends 2103 a Random Access Response (RAR) on the PDSCH (Physical Downlink Shared Channel) addressed on the PDCCH with the (Random Access) RA-RNTI identifying the time-frequency slot in which the preamble was detected (Please note that the Random Access Response is sometimes also referred to as the Random Access Response Grant). The Random Access Response itself conveys the detected RACH preamble, a timing alignment command (TA command) for synchronization of subsequent uplink transmissions, an initial uplink resource assignment (grant) for the transmission of the first scheduled transmission by the user equipment and an assignment of a Temporary Cell Radio Network Temporary Identifier (T-CRNTI). This T-CRNTI is used by eNodeB in order to address the mobile(s) whose RACH preamble were detected until RACH procedure is finished, since the "real" identity of the mobile is at this point not yet known by eNodeB.

Although the Random Access Response also contains initial uplink resource assignment for the first uplink transmission by a user equipment, same is not identical to the UL-DCI formats discussed previously herein, such as for example the formats shown in FIG. 4 or FIG. 19. The initial uplink resource assignment however also contains inter alia a CQI request flag and the Hopping flag, as well as a 10-bit "Fixed size resource block assignment". Hence, also during random access the user equipment can be requested by the eNodeB or relay node to provide channel quality feedback within the allocated resources for the initial transmission (i.e. setting the CQI request flag in the Random Access Response). When reusing the random access procedure as outlined with respect to FIG. 21 above in a communication system using component carrier aggregation, e.g. in LTE-A (Release 10), again the Hopping flag and/or (one or more bits of) the "Fixed size resource block assignment" could be used for indicating to the user equipment, on which of the available downlink component carriers the user equipment should provide channel quality feedback in the initial uplink transmission. For example, an implementation as discussed with respect to FIG. 8 and FIG. 10 can be directly applied to the interpretation of the contents of the Random Access Response message by the user equipment.

Another embodiment of the invention relates to the implementation of the above described various embodiments using hardware and software. It is recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments of the invention may individually or in arbitrary combination be subject matter to another invention.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A communication apparatus comprising:
a receiver, which in operation, receives Channel Quality Information (CQI) control information consisting of a plurality of bits in a downlink control information (DCI) format, the plurality of bits indicating a CQI report request specifying whether a CQI report is requested or not and, when the CQI report is requested, the plurality of bits jointly indicating both the CQI report request and a resource indication specifying one or more downlink component carriers, among a plurality of downlink component carriers, for which the CQI report is requested, wherein no one bit of the plurality of bits alone indicates the CQI report request; and
a transmitter, which in operation, transmits the CQI report for said one or more downlink component carriers, when the CQI report is requested,
wherein the plurality of bits are capable of representing a first bit combination which indicates that the CQI report is requested for at least one downlink component carrier indicated by an RRC signaling.

2. The communication apparatus according to claim 1, wherein the plurality of bits are two bits.

3. The communication apparatus according to claim 2, wherein the two bits are capable of representing a second bit combination which indicates that the CQI report is not requested and a third bit combination which indicates that the CQI report is requested for a downlink component carrier on which the CQI control information is transmitted.

4. The communication apparatus according to claim 1, wherein the CQI report request is a request for an aperiodic CQI report.

5. The communication apparatus according to claim 1, wherein the CQI report is transmitted over a physical uplink shared channel (PUSCH).

6. The communication apparatus according to claim 1, wherein the plurality of bits are two bits, and the two bits are capable of indicating that the CQI report is not requested or that the CQI report is requested for a downlink component carrier on which the CQI control information is transmitted.

7. A communication method comprising:
receiving Channel Quality Information (CQI) control information consisting of a plurality of bits in a downlink control information (DCI) format, the plurality of bits indicating a CQI report request specifying whether a CQI report is requested or not and, when the CQI report is requested, the plurality of bits jointly indicating both the CQI report request and a resource indication specifying one or more downlink component carriers, among a plurality of downlink component carriers, for which the CQI report is requested, wherein no one bit of the plurality of bits alone indicates the CQI report request; and
transmitting the CQI report for said one or more downlink component carriers, when the CQI report is requested, wherein the plurality of bits are capable of representing a first bit combination which indicates that the CQI report is requested for at least one downlink component carrier indicated by an RRC signaling.

8. The communication method according to claim 7, wherein the plurality of bits are two bits.

9. The communication method according to claim 8, wherein the two bits are capable of representing a second bit combination which indicates that the CQI report is not requested and a third bit combination which indicates that the CQI report is requested for a downlink component carrier on which the CQI control information is transmitted.

10. The communication method according to claim 7, wherein the CQI report request is a request for an aperiodic CQI report.

11. The communication method according to claim 7, wherein the CQI report is transmitted over a physical uplink shared channel (PUSCH).

12. The communication method according to claim 7, wherein the plurality of bits are two bits, and the two bits are capable of indicating that the CQI report is not requested or that the CQI report is requested for a downlink component carrier on which the CQI control information is transmitted.

* * * * *